United States Patent [19]

Morioka et al.

[11] Patent Number: 5,923,683
[45] Date of Patent: Jul. 13, 1999

[54] COHERENT WHITE LIGHT SOURCE AND OPTICAL DEVICES THEREWITH

[75] Inventors: Toshio Morioka; Kunihiko Mori; Masatoshi Saruwatari, all of Yokosuka, Japan

[73] Assignee: Nippon Telegraph and Telephone Corporation, Tokyo, Japan

[21] Appl. No.: 08/606,438

[22] Filed: Feb. 23, 1996

[30] Foreign Application Priority Data

Feb. 24, 1995 [JP] Japan .................................... 7-037199
Sep. 14, 1995 [JP] Japan .................................... 7-236914

[51] Int. Cl.$^6$ ...................................................... G02F 1/39
[52] U.S. Cl. ............................................... 372/6; 359/330
[58] Field of Search ................................... 359/326–332; 385/15, 24, 27; 372/6, 69, 92

[56] References Cited

U.S. PATENT DOCUMENTS

| | | | |
|---|---|---|---|
| 3,875,422 | 4/1975 | Stolen | 359/330 |
| 5,323,404 | 6/1994 | Grubb | 372/6 |
| 5,365,362 | 11/1994 | Gnauck et al. | 372/6 X |

OTHER PUBLICATIONS

Coherence and Energy Transfer in Glasses, Plenum Press, New York, 1984, edited by Paul A. Fleury and Brage Golding, pp. 209–211 [No Month].
R.R.. Alfano et al., "Emission in the Region 4000 to 7000 Å Via Four–Photon Coupling in Glass", Physical Review Letters, 24(11):584–587 (1970) (Mar.).
P.L. Baldeck et al., "Intensity Effects on the Stimulated Four Photon Spectra Generated by Picosecond Pulses in Optical Fibers", Journal of Lightwave Technology, LT–5(12): 1712–1715 (1987) (Dec.).
M.N. Islam et al., "Broad Bandwidths From Frequency–Shifting Solitions in Fibers", Optics Letters, 14(7):370–372 (1989) (Apr.).
R.R. Alfano Ed., "The Supercontinuum Laser Source", (Only Cover, Contents, and Contributors), Springer–Verlag, 1989, New York [No Month].

Dorsinville, R., et al., "Generation of 3–ps pulses by spectral selection of the continuum generated by a 25–ps second harmonic Nd:YAG laser pulse in a liquid", Applied Opt., 27, pp. 16–18, 1988 (Jan.).
Morioka T. et al., "Nearly Penalty–Free, <4PS Supercontinuum GBIT/S Pulse Generation Over 1535–1560 NM", Electronics Letters, vol. 30, No. 10, May 12, 1994, pp. 790–791.
Morioka T. et al., "Transform–Limited, Femtosecond WDM Pulse Generation By Spectral Filtering of Gigahertz Supercontinuum", Electronics Letters, vol. 30, No. 14, Jul. 7, 1994, pp. 1166–1168.
Morioka T. et al., "Pulse–Width Tunable, Self–Frequency Conversion of Short Optical Pulses over 200 nm based on Supercontinuum Generation", Electronics Letters, vol. 30, No. 23, Nov. 10, 1994, pp. 1960–1962.
Morioka T. et al., "Group Velocity Dispersion Measurement Using Supercontinuum Picosecond Pulses Generated in an Optical Fibre", Electronics Letters, vol. 29, No. 11, May 27, 1993, pp. 987–989.

*Primary Examiner*—John D. Lee
*Attorney, Agent, or Firm*—Finnegan, Henderson, Farabow, Garrett & Dunner, L.L.P.

[57] ABSTRACT

A coherent white light source generates a uniform and continuous coherent white light spectra over 200 nm at a low pump power. The source is based on a pump light source which produces pump optical pulses at a wavelength $\lambda_0$ and an optical waveguide to receive a pump optical pulse at $\lambda_0$ to generate a white pulse having a wavelength spread of $\Delta\lambda$. The optical waveguide is characterized by having dispersion properties such that four-wave mixing light having a wavelength spread of $\lambda_0 \pm \Delta\lambda/2$ is produced, and the power gain of the four-wave mixing light is greater than 1. These properties of the waveguide are defined by: the path length of the waveguide device ln $G_0/(2|\gamma|P)$ in units of [km], an absolute value of the dispersion slope to be not more than $16(|\gamma|E)$ $(\Delta\lambda \ln G_0)$ in units of [ps/nm$^2$/km] and an absolute value of the dispersion at the wavelength $\lambda_0$ to be not more than $(16/\pi c) \lambda_0^2 |\gamma| P/(\Delta\lambda)^2$ in units of [ps/nm/km]. Examples of optical devices utilizing such a super-wideband coherent white light source are demonstrated.

37 Claims, 23 Drawing Sheets

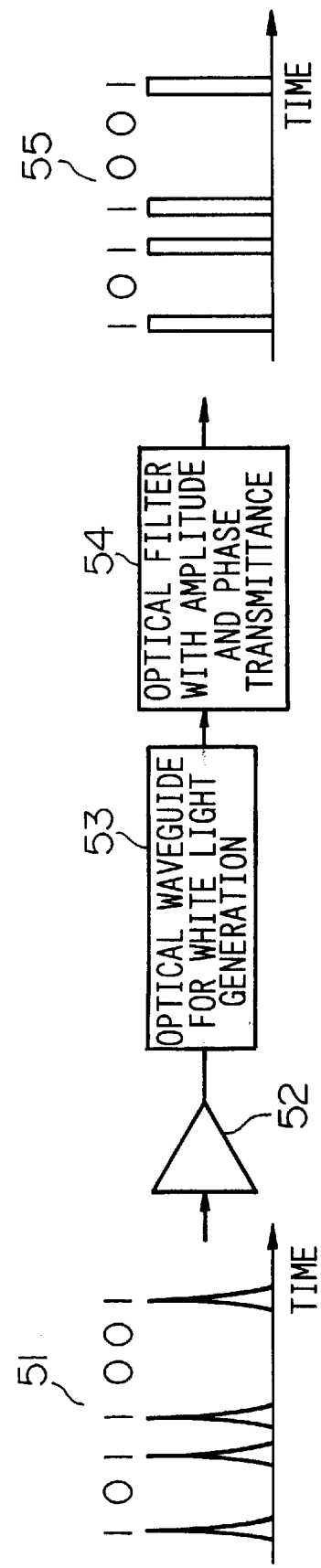

COHERENT WHITE LIGHT SOURCE AND OPTICAL DEVICES THEREWITH

BACKGROUND OF THE INVENTION

1. Field of the Invention

The present invention relates in general to optical devices, and relates in particular to a white light source which generates a coherent super-wideband white light on both ends of a pump optical pulse wavelength, and to optical devices utilizing the coherent white light source.

2. Description of the Related Art

A conventional method for generating super-wideband white light is to excite various nonlinear optical materials with ultra-short light pulses in the range of pico to femto seconds and to generate a combined effect of third order nonlinear effects so as to achieve a huge increase in the bandwidth of the generated spectrum. Nonlinear optical materials include such gaseous substances as xenon, liquid substances such as $CS_2$, $D_2O$, $CCl_4$, and solid substances such as glass, optical fiber, and semiconductors.

The spectral pattern of the white light generated in a multi-mode optical fiber as a nonlinear optical material is discontinuous, as shown in FIG. 23, and it can be seen that the spectral components are very complex. The spectral power of the generated white light is not uniform nor constant over the range of the generated wavelengths. Furthermore, it is necessary to use a pump power of over 100 W, necessitating the use of a high power large-size laser sources (a pulse repetition frequency of which is in the order of 100 MHz), such as a solid state laser, as a pump light source. For this reason, conventional white light could not be used as a light source for optical communications which require a repetition frequency in excess of giga hertz. (Refer to R. R. Alfano Ed., "The Supercontinuum Laser Source", Springer-Verlag, 1989, New York.)

Furthermore, because the generated white light pulses lack coherency; even if certain wavelength components are filtered out from the white light spectrum with a wavelength selective device such as an optical bandpass filter, it is not possible to obtain a transform-limited pulse (referred to as a TL-pulse) having the minimum pulse width for a given bandwidth which is determined by the time-frequency relationships in the Fourier transform. More specifically, with reference to R. Dorsinvilie, et al., "Generation of 3-ps pulses by spectral selection of the continuum generated by a 25-ps harmonic Nd:YAG laser pulse in a liquid", Applied Opt., 27, pp.16–18, 1988; and M. N. Islam, et al., "Broad bandwidths from frequency-shifting solitons in fibers", Opt. Lett., 14, pp. 370–372, 1989, the time-bandwidth product (a product of the pulse width and the spectral bandwidth) of the generated white light pulses are several times or up to ten times larger compared with the minimum value which is given by the corresponding time-bandwidth product of the TL-pulse. This means that to generate a given pulsewidth, it is necessary to have a bandwidth up to ten times wider, and it is difficult to utilize the generated white pulses from such a source in optical fiber communication systems which are affected by the dispersion effects in the optical fibers. Moreover, those low-coherent white light sources produce a large amount of beat noise, meaning that it is difficult to carry a signal on them.

The reasons that the white pulses produced by the conventional method exhibit a complex spectrum, that the light source requires a high excitation power, that the resulting white light lacks coherency are due to the fact that the third-order nonlinear optical effects are achieved primarily by a combined effect of stimulated Raman scattering, self-phase modulation, cross-phase modulation and the four-wave mixing process involving phase-matching of higher order transverse spatial-mode waves.

The mechanism of the conventional method of white pulse generation is explained in more detail below. First, Raman light is generated by stimulated Raman scattering, with its center wavelength shifted to the longer wavelength side by an amount equal to the Raman shift characteristic of the optical material. Or, a multiple of four-wave mixing light components are generated, with a center wavelength centered about the pump light wavelength by the process of phase matching in higher order transverse-modes. When the pump power is increased further, the newly generated spectral components will grow to their full extent, and are spread out further by the processes of self-phase modulation, cross-phase modulation. The result is that the line spectra of the pump light and these component waves superimpose on each other to generate a white-light band. The white light spectrum thus generated exhibits a complex structure, and the necessary pump power is high because the stimulated Raman scattering, four-wave mixing, self-phase modulation and cross-phase modulation are all involved. The coherency of the white light spectrum becomes degraded because the spectrum is affected by the complex phase modulations involving the self-phase and cross-phase modulations in the generation process.

It results that the conventional method of generating white light cannot provide white pulses of high coherency having a continuous and uniform spectrum, and its application has been limited to special uses in laboratories, such as optical spectroscopy sources pumped by high power lasers.

On the other hand, the future optical communication is expected to be based on a system combining the techniques of optical time-division multiplexing (optical TDM) and wavelength-division multiplexing (WDM) to a achieve a quantum jump in the transmission capacity of optical fibers. The optical TDM technique is based on multiplexing optical pulses from different channels on a timescale, and the transmission capacity is increased by the additional number of channels. The WDM technique is based on superimposing a signal wave on optical carrier frequencies (wavelengths) of many different wavelengths, and the transmission capacity is increased by the additional number of optical carrier waves.

In the past, to obtain different optical carrier frequencies needed to operate the WDM technique, it has been proposed to simultaneously select several wavelength components by filtering white light having a super-wide band through optical filters. The optical carrier frequencies thus obtained are significantly more controllable in terms of wavelength and its temperature stability than those produced by using a number of different light sources, depending merely on the properties of the optical filters employed. However, because the white light previously produced by the conventional method lacks coherency, as explained above, it was difficult to generate multi-wavelength wideband signals in the giga Hz repetition region having a high signal to noise (S/N) ratio and to further time-division multiplex such signals to obtain low-noise TDM/WDM multiplexed signals. Therefore, in the conventional WDM technique, it was necessary to provide as many sources of light as the number of carrier waves that are necessary for that particular communication system.

The device configuration for generating wavelength-division multiplexed signals in the conventional WDM technique is shown in FIG. 24.

The device comprises: a plurality (n pieces in the FIG. 24) of laser sources 101-1 to 101-n oscillating at different optical frequencies to generate a plurality of wavelengths; and the corresponding external modulators 102-1 to 102-n; where each of the output optical signal is modulated electrically in an assigned channel. The signals are combined in an optical multiplexer 103 and are forwarded to an optical transmission route 104.

In the process, a portion of the output light from the optical multiplexer 103 is used to control the oscillation optical frequencies of the individual laser sources so that the output is spaced apart periodically. In practice, the oscillation optical frequency of each laser source is matched to the transmission frequency of a periodic optical filter 105, such as a ring resonator having a property to produce periodic transmissions. This operation of the filter 105 is as follows. Each laser source 101-1 to 101-n is modulated by the low-frequency electrical signal $F_1$ to $F_n$ output from the respective oscillators 106-1 to 106-n. A portion of the output light from the optical multiplexer 103 passes through the periodic optical filter 105 and is converted to electrical signals by the optical/electrical conversion circuit 107, and are transformed by the low frequency electrical signals $F_1$ to $F_n$ into respective baseband signals for each channel. Each of the baseband signals, after passing through the low-pass filter (LPF) 108-1 to 108-n and the proportional differentiation/integration circuitries (PID) 109-1 to 109-n, is made to feedback into the corresponding biasing electrical current for each of the laser sources, and are controlled so as to match the oscillation frequencies of laser sources 101-1 to 101-n with the transmission frequency of the periodic optical filter 105.

As described above, although the device is controlled to make the oscillation frequencies of each of the laser sources 101-1 to 101-n to be periodically spaced, in the conventional wavelength-division multiplexed signal generation device, it is not easy to control the device so as to produce an absolute wavelength to serve as a reference wavelength.

The need for a super-wideband, coherent white light source having a uniform and continuous spectrum is not limited to applications in a WDM-based system. From viewpoints of simplifying the construction and economy of the apparatus, such a light source is needed in the field of measuring devices to study various wavelength-dependent optical properties, such as delay-times for a group of optical devices, and to define time-response characteristics of non-linear phenomena.

SUMMARY OF THE INVENTION

It is an object of the present invention to provide a coherent white light source having a uniform and continuous spectra without exhibiting a complex spectral structure, and to generate super-wideband white light at a low excitation power. It is a further object to provide applications of the super-wideband white light source to various optical devices.

The coherent white light source comprises: a pump optical pulse generation device for generating pump optical pulses having a wavelength $\lambda_0$; and an optical waveguide means for receiving the pumping optical pulses generated by the pump optical pulse generation means to generate white pulses having a wavelength range $\Delta\lambda$; wherein the optical waveguide device is provided with a dispersion value and a dispersion slope so as to produce a four-wave mixing light over a wavelength range $\lambda_0 \pm \Delta\lambda/2$, and a waveguide length so that an optical power gain of the four-wave mixing-light is not less than one. That is, the waveguide length of the waveguide device is given by $\ln G_0/(2|\gamma|P)$ in units of [km] and an absolute value of the dispersion gradient is not more than a value given by: $16(|\gamma|E)/(\Delta\lambda^2 \ln G_0)$ in units of [ps/nm$^2$/km] and an absolute value of the dispersion at the wavelength $\lambda_0$ is not more than a value given by: $(16/\pi c)\lambda_0^2|\gamma|P/(\Delta\lambda)^2$ in units of [ps/nm/km] where $\gamma$ is a third-order nonlinear coefficient; E is an energy per one pump optical pulse; P is the peak power of a pump optical pulse which is given by $P=\alpha P_0$, where $\alpha$ is a modification factor, and $P_0$ is the peak power of a pump optical pulse input into the waveguide; $G_0$ which is not less than two is an optical power gain of four-wave mixing light, and c is a speed of light in a vacuum.

An application of the coherent white light source to an optical device is demonstrated in a time-division multiplexed, wavelength-division multiplexed signal generator. The coherent white light output from the source is separated into optical pulses each having a different wavelength. Each pulse is separated into a plurality of optical paths, and each pulse is modulated by different electrical signals in a modulator provided for each wavelength component. The modulated pulse signals are delayed in an optical delay line provided for each wavelength component by a specific time delay, and the modulated time-delayed signals are coupled in an optical coupler into a single group of time-division multiplexed, wavelength-division multi/multiplexed signals.

The principle of generation of coherent white light in the coherent white light source will be explained with reference to FIG. 1.

The spectral bandwidth of a pump optical pulse input into the waveguide begins to widen symmetrically on both sides of a center wavelength of the pump optical pulse owing to self-phase modulation (Refer to curves 1). When the spectral broadening caused by self-phase modulation beings to superimpose on the gain band shape of a four-wave mixing which is an optical parametric process, nucleating from the spectral components expanded by the effects of self-phase modulation, the spectrum of the pump optical pulse begins to spread out coherently up to the gain bandwidth along the gain curve (refer to curves 2) of the four-wave mixing process (refer to curves 3). In the spectrum broadening process, the self-phase and cross-phase modulations are involved in phase matching in the four-wave mixing process. The optical power of the pump optical pulse gradually decreases, and when the gain bandwidth, which is proportional to a square root of the pump optical pulse power, begins to decrease, the spectral broadening stops.

The white light spectrum thus generated is a product of spreading out on both sides of the center wavelength of the pump optical pulse, as seen in the illustration, and exhibits a continuous uniformity. The coherence of the white light generated is determined by the coherence of the pump optical pulse at the time of the generation of the four-wave mixing light; therefore, by using a pump optical pulse of possessing high coherency, the resulting white light would also exhibit a high coherency. The self-phase modulation which forms a nucleus for the four-wave mixing process is induced at a low pump power, and the necessary pump optical pulse power for producing a certain gain bandwidth in the four-wave mixing process decreases proportionally to a dispersion in the waveguide; therefore, the pump power can be controlled readily by choosing a waveguide having low dispersion characteristics.

As explained above, the coherent white light source of the present invention enables to generate, at a low pump power, coherent white light having a uniform and continuous spectral power over a super-wide bandwidth (200 nm) at GHz repetition frequency, without exhibiting a complex spectral structure.

The time-division multiplexed, wavelength-division multiplexed signal generator presented above enables to generate time-division multiplexed, wavelength-division multiplexed signals by inputting white pulses generated by the coherent white light source into an optical wavelength demultiplexer or a wavelength selective device to generate a plurality of optical pulse groups, each group having a different wavelength component, and separating each wavelength component into a plurality of independent modulated signals, and the modulated signals are time-division multiplexed and wavelength multiplexed to produce time-division mutliplexed, wavelength-division multiplexed signals over a super-wide wavelength range of approximately 200 nm bandwidth at a total bit rate of over 1 Tbit/s.

BRIEF DESCRIPTION OF THE DRAWINGS

FIG. 18 is an example of the configuration of pulse shaping apparatus in Embodiment 10.

DESCRIPTION OF THE PREFERRED EMBODIMENTS

Preferred embodiments are presented with reference to the drawings.

Embodiment No. 1

Figure 1:
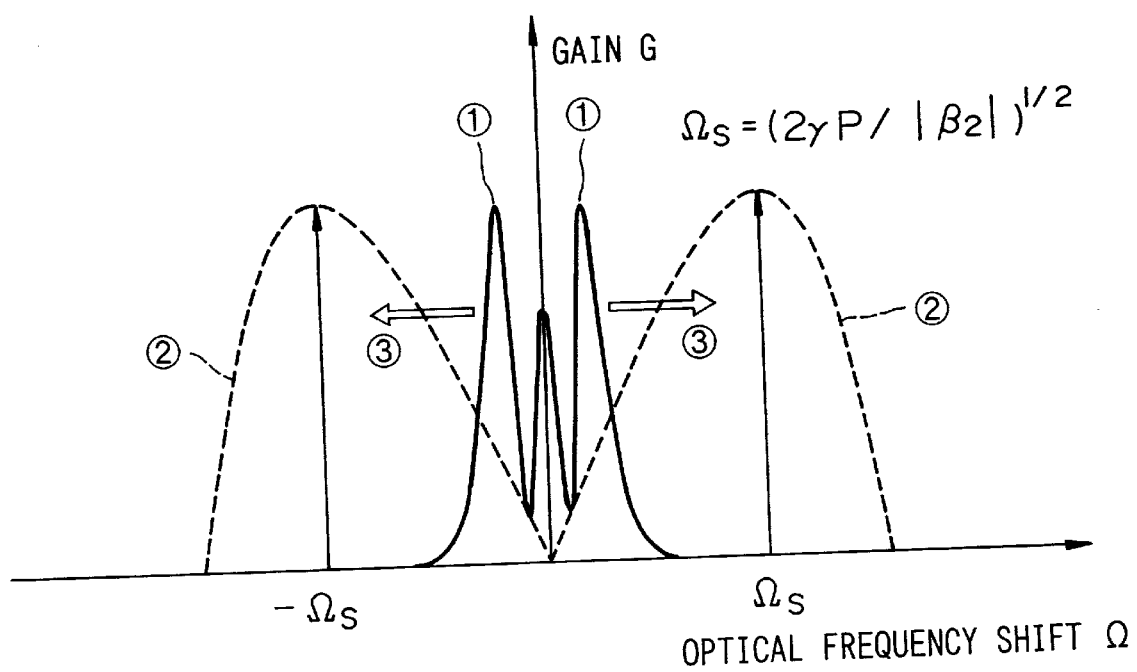
FIG. 1 is an illustration of the principle of white light generation in the coherent white light source of the present invention.
Figure 2:
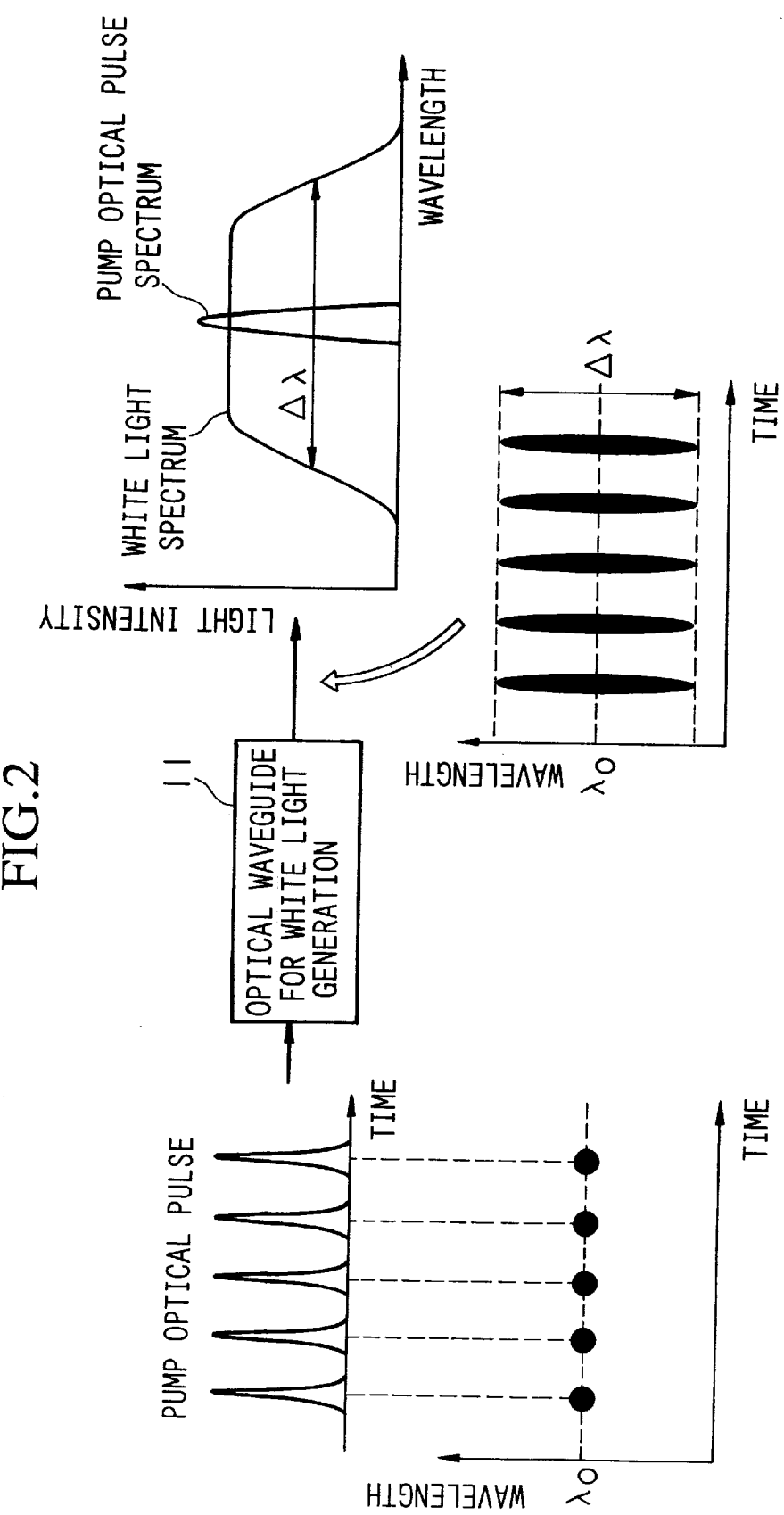
FIG. 2 is a schematic illustration of the pumping optical pulses and the optical spectrum of the white light generated from the source in Embodiment 1.

FIG. 2 illustrates the input and output pulse time-resolved spectral images to and from the coherent white light source excluding the pump light source of Embodiment 1.

As illustrated in FIG. 2, when pumping optical pulses (from a optical pump source, not shown) having the center wavelength at $\lambda_0$ are input into an optical waveguide 11 for generation of white light (referred to as white light waveguide 11 hereinbelow) having a specific dispersion gradient manifested in a dispersion slope, and a specific magnitude of dispersion, white pulses having a center wavelength at $\lambda_0$ and a wavelength extent of $\Delta\lambda$ are output.

A mode-locked fiber ring laser, a mode-locked semiconductor laser, a gain switched semiconductor laser, or an optical pulse generator using electro-absorption modulator, for example, can be utilized as the above-described optical pump source. Shorter optical pump pulses are also obtained by utilizing conventional soliton compression techniques applied to the above-described optical pump sources.

The following is a derivation for a rule governing the dispersion slope and the magnitude of dispersion in the waveguide 11.

From the theory of four-wave mixing (FWM) process, an optical angular frequency difference $\Omega_S$ between the pump wave wavelength $\lambda_0$ for a maximum gain and the FWM wave wavelength $\lambda_f$ is given by:

$$\Omega_S = 2\pi c |1/\lambda_0 - 1/\lambda_f|$$

where c is the speed of light in a vacuum; and can be expressed as:

$$\Omega_S = (2|\gamma|P/|\beta_2|)^{1/2} \text{ given in units of [THz]} \quad (1).$$

where $\gamma$ is the third order nonlinear coefficient of the waveguide, given by $2\pi n_2/(\lambda A_{\mathit{eff}})$ in units of $[1/(\text{W km})]$ and $A_{\mathit{eff}}$ is the effective cross sectional area of the waveguide in $[m^2]$; $n_2$ is the refraction index of the waveguide in $[m^2/W]$; P is the peak power of pumping optical pulses within the waveguide in [W]; and $\beta_2$ is the magnitude of dispersion in the waveguide in $[ps^2/km]$.

For a length L in [Km] of the waveguide, the gain $G_0$ in the optical power of the FWM-light at the angular frequency difference $\Omega_S$ is given by:

$$G_0 = \exp(2|\gamma|PL) \quad (2).$$

For generation continuous white light, it is necessary that there be some gain at $\Omega_S$, meaning that the gain $G_0$ in equation (2) be greater than 1. From this condition, the required length Lc of the waveguide for generating white light is given by:

$$Lc = \ln G_0/(2|\gamma|P) \quad (3).$$

Here, the group delay different $\tau$ in [ps] between the pump optical pulses at $\lambda$ and the FWM-light at $\lambda_0 \pm \Delta\lambda/2$ in the waveguide of length Lc having the absolute value of a dispersion slope $|dD(\lambda)/d\lambda|$ in [ps/nm²/Km] can be approximated by:

$$\tau = (\tfrac{1}{2})|dD(\lambda_0)/d\lambda|(\Delta\lambda/2)^2 \, Lc = (\ln G_0/16)|dD(\lambda_0)/d\lambda|\Delta\lambda^2/(|\gamma|P) \quad (4).$$

To generate FWM-light at wavelength $\lambda_0 \pm \Delta\lambda/2$, it is necessary that the pump optical pulses are temporally overlapped with the FWM-light processes, and for this condition to be fulfilled, the group delay difference $\tau$ must be less than the pump optical pulse width $\Delta t_0$ (full width at half maximum, FWHM in units of [ps]), and is expressed as:

$$\Delta t_0 \geq \tau = (\ln G_0/16)|dD(\lambda_0)/d\lambda|\Delta\lambda^2/(|\gamma|P) \quad (5).$$

This means that the dispersion slope must satisfy a condition that:

$$|dD(\lambda_0)/d\lambda| \leq 16(|\gamma|P\Delta t_0)/(\Delta\lambda^2 \ln G_0) \quad (6).$$

Because $P\Delta t_0$ is approximately equal to the pump optical pulse energy E, equation (6) can be expressed as:

$$|dD(\lambda_0)/d\lambda| \leq 16(|\gamma|E)/(\Delta\lambda^2 \ln G_0) \quad (7).$$

Next, for the pumping optical pulses to generate FWM-light of wavelength $\lambda_0 \pm \lambda/2$ in the waveguide, at least the gain bandwidth ($\propto \Omega_S$) must be greater than $\Delta\lambda/4$. Therefore, the angular frequency difference $\Omega_S$ is give by:

$$\Omega_S = (2|\gamma|P/|\beta_2|)^{1/2} \geq 2\pi c\Delta\lambda/(4\lambda_0^2) \quad (8).$$

Using an expression relating $\beta_2$ and $D(\lambda)$ shown below:

$$|\beta_2| = \lambda^2 |D(\lambda)|/(2\pi c) \quad (9),$$

the condition for dispersion in the waveguide for generation of white light is given by:

$$|D(\lambda_0)| \leq (16/\pi c)\lambda_0^2 |\gamma|P/(\Delta\lambda)^2 \quad (10).$$

It should be noted that the condition given by equation (10) must hold at least over the fiber length $\ln G_0/(2|\gamma|P)$ given in equation (3).

The peak power P of the pumping optical pulses propagating in the waveguide and the peak power $P_0$ of the pump optical pulse input into the waveguide are generally different from each other because of waveform change and other factors in the course of propagation. This effect can be expressed using a modification factor $\alpha$ as $P = \alpha P_0$. Also, when the waveguide is an optical amplifying material, the modification factor $\alpha$ is the same as its optical amplification factor (gain).

Figure 3:
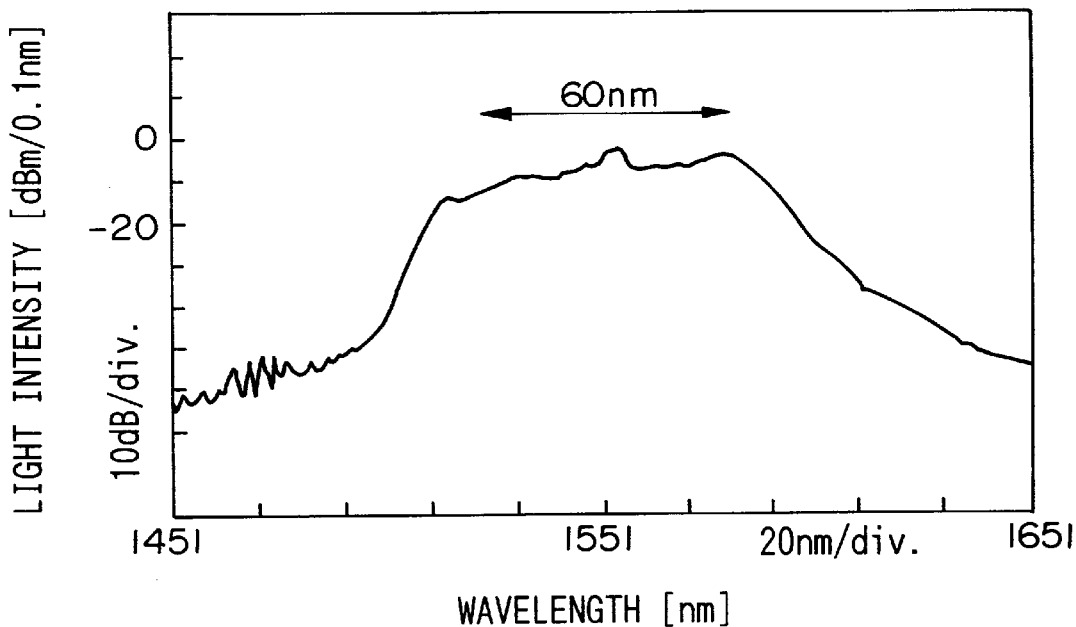
FIG. 3 is a white light spectrum from a single-mode optical fiber.

Returning to equation (7), an alternative expression:

$$\Delta\lambda \leq 4\{(\ln G_0|\gamma|E)/|dD(\lambda_0)/d\lambda|\}^{1/2} \quad (11)$$

provides a spectral spread of the white light from the absolute value of the dispersion slope $|dD(\lambda_0)/d\lambda|$. The validity of equation (11) can be verified by using values obtained by experiments using a single-mode fiber as an optical waveguide for white light generation. Letting $G_0 = e$ (ln $G_0 = 1$), and using experimental parameters of $n_2 = 3.2 \times 10^{-20}$ [m²/W]; $\gamma = 2.5$ [1/Km]; dispersion slope 0.07 [ps/nm²/Km]; pump optical pulse energy E=7 [pj] where pulse width $\Delta t_0 = 3.5$ [ps], and peak power P=2 [W]; equation (11) gives the wavelength range $\Delta\lambda < 63.2$ [nm] which agrees well with the spectral broadening of white light spectrum shown in FIG. 3.

Figure 4:
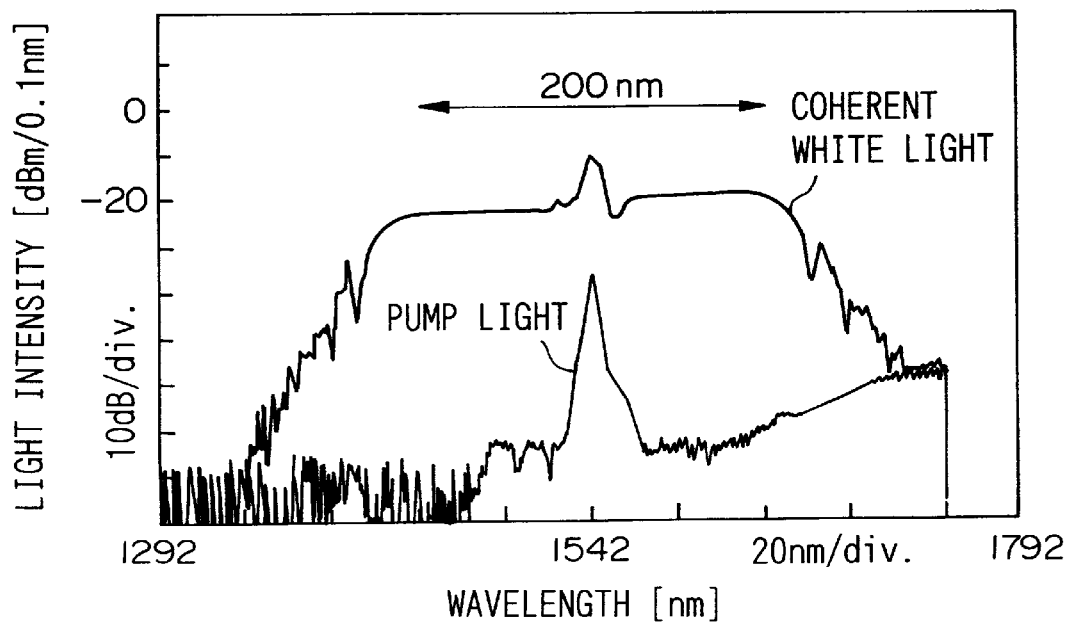
FIG. 4 is a white light spectrum from a single-mode optical fiber having a low dispersion slope.

FIG. 4 shows a result of another experiment using a single mode fiber having a small dispersion slope. In this case, for $n_2 = 3.2 \times 10^{-20}$ [m²/w]; $\gamma = 4.0$ [1/Km]; dispersion slope 0.01 [ps/nm²/Km]; and pump optical pulse energy E=7 [pj]; equation (11) gives the wavelength range $\Delta\lambda < 211.7$ [nm] which again agrees well with the experimental result.

Figure 5:
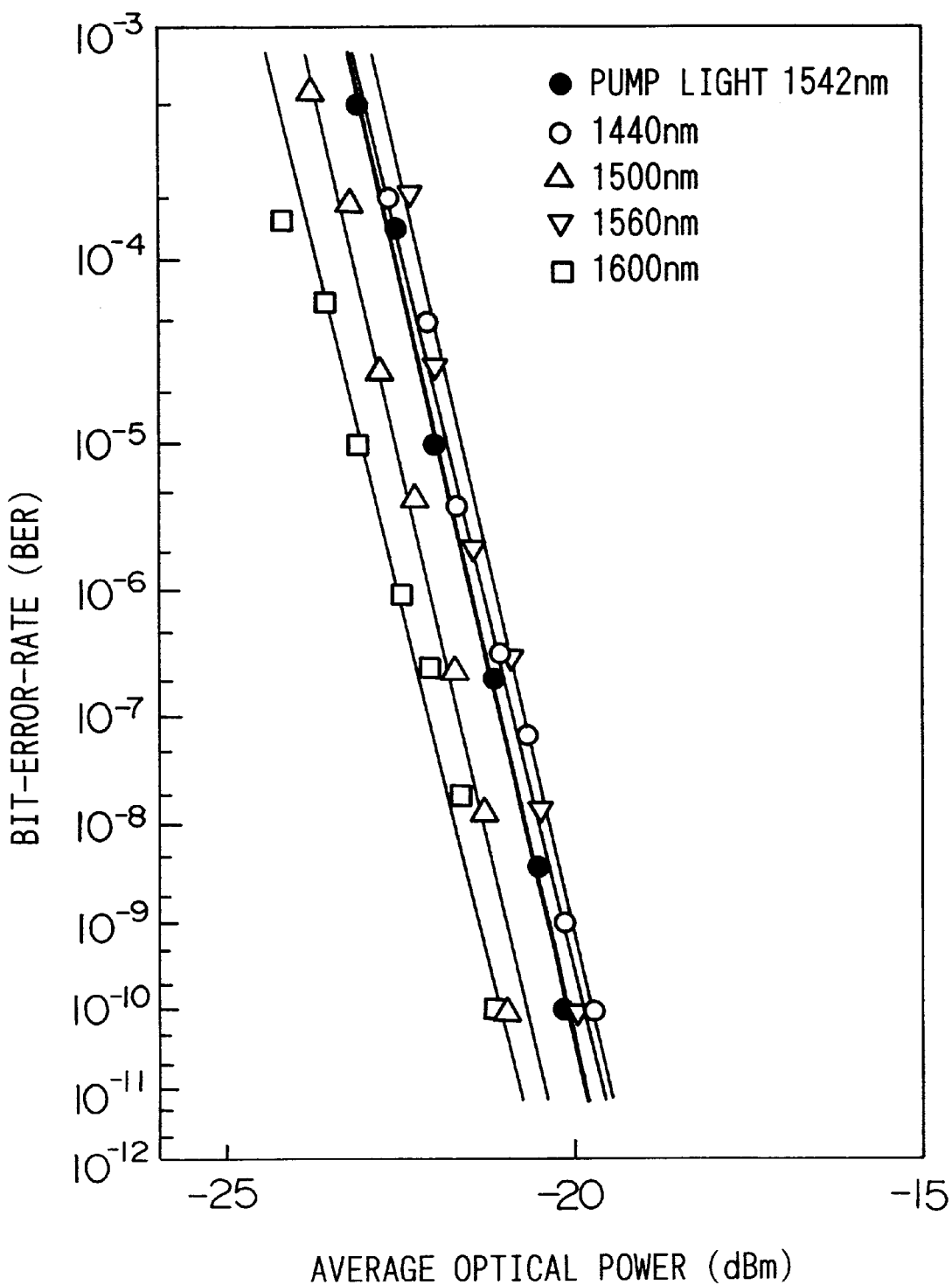
FIG. 5 is a graph showing the bit-error-rate curves of the white light shown in FIG. 4.

FIG. 5 shows the noise characteristics (in terms of the bit-error-rate (BER)) of white light obtained by filtering the coherent white light shown in FIG. 4 with a tunable optical bandpass filter having a bandwidth 1 nm. The results show that the coherent white light pulses at 1440, 1500, 1560, and 1600 nm generated by pumping optical pulses at 1542 nm wavelength, exhibit no noticeable BER degradation, and maintain a high coherency and extremely low noise in their output pulses.

Figure 6:
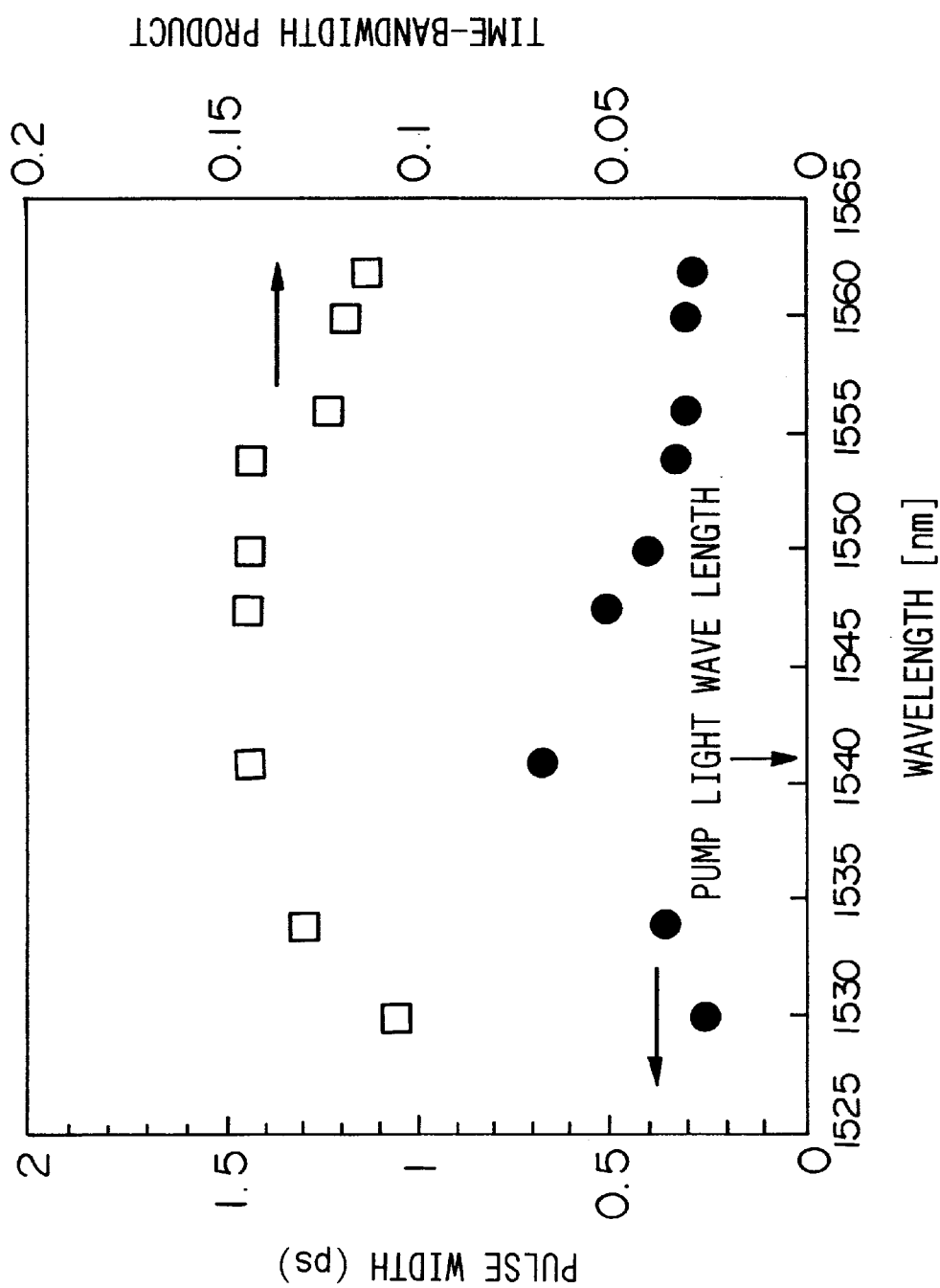
FIG. 6 is a graph showing the wavelength-dependence of the pulse width and time-bandwidth product of the white light shown in FIG. 4.

FIG. 6 shows a wavelength-dependence of the pulse width and the time-bandwidth product of white light obtained by filtering the white light shown in FIG. 4 with a tunable optical bandpass filter having a bandwidth 3 nm. The results accurately verify the excellence of the coherent white light generation apparatus producing white light having pulse widths between 200 to 600 [fs], and the time-bandwidth product between 0.1 and 0.15 roughly corresponding to a Lorentz-type spectral shape.

When a condition $D(\lambda_0)\gamma > 0$ is satisfied, the pumping optical pulses propagating in the waveguide become a soliton. Here $D(\lambda_0) < 0$ corresponds to a condition of ordinary (normal) dispersion and $D(\lambda_0) > 0$ corresponds to anomalous dispersion. In ordinary fibers, $\gamma > 0$. For example, the order of the Nth soliton is give by:

$$N = T_0\{(|\gamma|P)/|\beta_2|\}^{1/2} \quad (12)$$

where $T_0$ is the pulse width of the pump optical pulses input into the waveguide, and its relation to the pulse width $\Delta t_0$ of the pump optical pulse is $\Delta t_0 = 1.665 T_0$ for Gaussian-type temporal shape, and for sech²-type temporal shape $\Delta t_0 = 1.76 T_0$.

Within the waveguide, the soliton compression is generally achieved through the combined effect of self-phase modulation and anomalous dispersion, and denoting the pulse width of the compressed soliton by $\Delta t_c$, then the compression factor Fc of the soliton of the order N>10, can be approximated by:

$$Fc \equiv \Delta t_0/\Delta t_c \approx 4.1 N \quad (13)$$

and, the peak power P in the waveguide is expressed as:

$$P = Fc Q c P_0 \quad (14)$$

where Qc is a coefficient related to the quality of the compressed soliton, and is given as a ratio of the energy of the compressed soliton to the total pulse energy. For N=10, Qc≈0.3, and equation (14) becomes $$P \approx 1.2 N P_0 \tag{15}$$

and the modification factor α is given as 1.2N.

Embodiment No. 2

Figure 7:
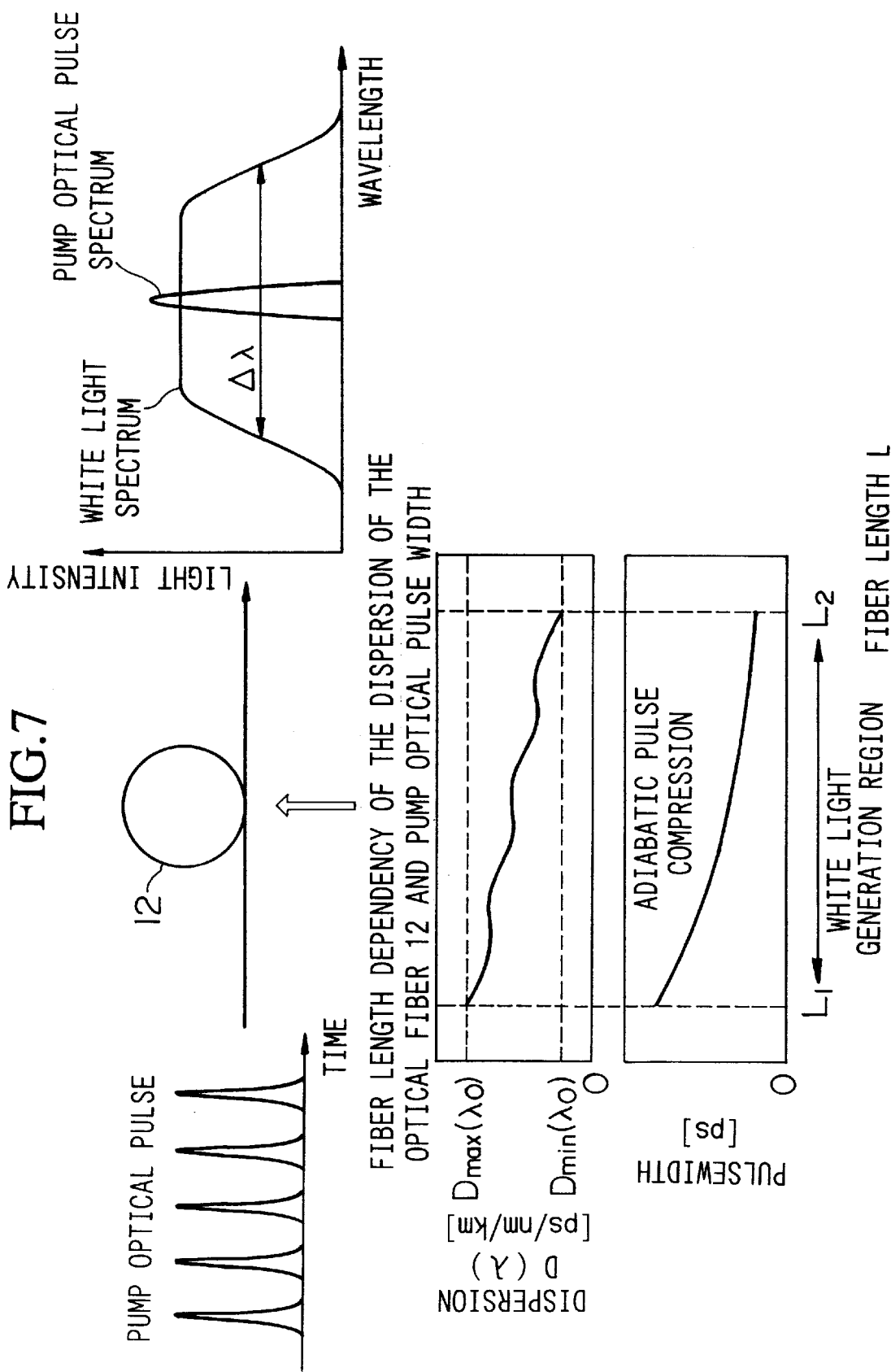
FIG. 7 is a schematic illustration of the pumping optical pulses and the optical spectrum of the white light generated from the source in Embodiment 2.

FIG. 7 illustrates the input and output pulse time resolved spectral images to and from the coherent white light source of Embodiment 2.

In this embodiment, the white light waveguide used in the white light generation device is a dispersion-distributed polarization-maintaining optical fiber 12, in which the dispersion values decrease in the longitudinal direction.

Figure 8:
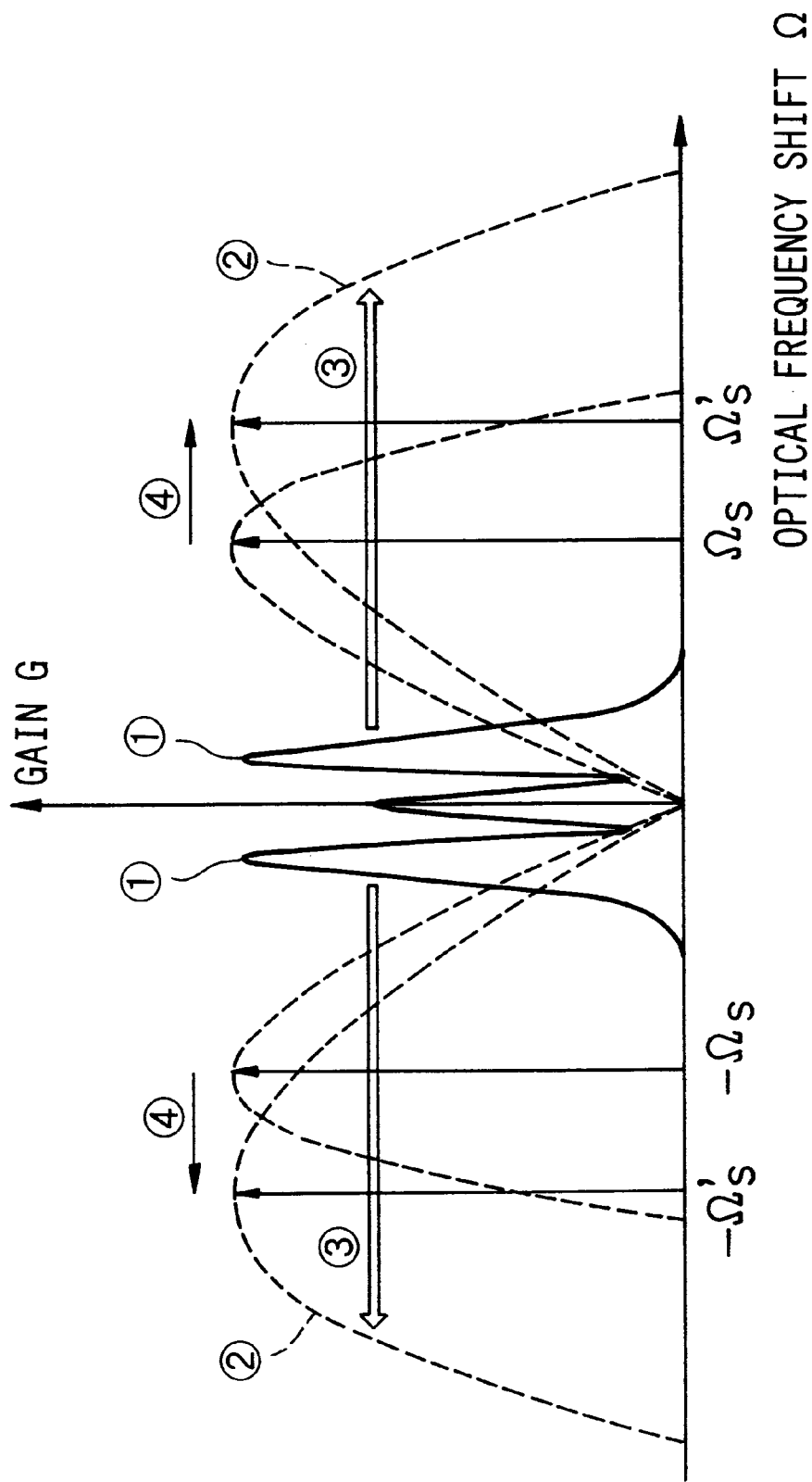
FIG. 8 is an illustration of the principle of white light generation in the coherent white light source of Embodiment 2.

The theory of white light generation in the dispersion-decreasing optical waveguide will be explained with reference to FIG. 8.

The optical spectrum of the pumping optical pulses input into the white light waveguide begins to broaden symmetrically on both sides of the pumping wavelength caused by the effect of self-phase modulation (SPM) (refer to curve 1). When the broadened periphery of the pumping spectral caused by SPM begins to superimpose on the FWM-wave gain band, the optical spectra, nucleating from the SPM spectral component, begin to broaden coherently along the FWM-wave gain curve (refer to curve 2) to the gain bandwidth (refer to region 3). At this time, the absolute value of the dispersion in the white light waveguide is gradually decreasing in the propagating direction, the pump optical pulse, while maintaining its coherency, undergoes an adiabatic pulse compression, and the pulse peak power increases. This induces the gain band width of the FWM-wave (which is proportional to the source root of the peak value, and inversely proportional to the square root of the dispersion value), to widen abruptly as seen in region 4, and the bandwidth of the generated white light increases explosively.

When $D(\lambda_0)\gamma>0$, the optical fiber 12 described above shows a dispersion behavior such that the absolute value $|D(\lambda_0)|$ of dispersion in the white light waveguide at $\lambda_0$ decreases uniformly and slowly within the white light generation region defined by $\Delta L$ (=$L_1$ to $L_2$). When the value of $\Delta L$ is sufficiently large compared to the soliton length $Ls=\pi T_0^2/(2|\beta_2|)$, adiabatic soliton compression occurs within the white light generation region, and the pump optical pulse output from the pump light source (not shown) produces pulse compression maintaining the same soliton order. The compression ratio, because the soliton order is unchanged, is given, in terms of the maximum value $D_{max}(\lambda_0)$ and the minimum value $D_{min}(\lambda_0)$ of the dispersion within the white light generation region, as:

$$|D_{max}(\lambda_0)/D_{min}(\lambda_0)| \tag{16}$$

Here, if it is assumed that the pump optical pulse energy is conserved, Fc in equation (13) is expressed as:

$$Fc=|D_{max}(\lambda_0)/D_{min}(\lambda_0)| \tag{17}$$

and the peak power P in the waveguide is given by:

$$P=|D_{max}(\lambda_0)/D_{min}(\lambda_0)|P_0 \tag{18}$$

and the modification factor α is obtained as $|D_{max}(\lambda_0)/D_{min}(\lambda_0)|$.

In ordinary silica optical fibers, the third order nonlinear coefficient γ is positive, and it is necessary that the dispersion $D(\lambda_0)>0$. There are cases of anomalous dispersion in which the sign of γ is negative in some semiconductor media, but in these cases, it is necessary that the dispersion $D(\lambda_0)<0$. The advantage of using an optical fiber whose absolute value of the dispersion decreases, as in this embodiment, is that it is possible to increase the peak power P in the white light waveguide, without losing the quality (the transform-limited characteristics) of pump optical pulses, and as a result the gain bandwidth of FWM-light given by equation (1) can be increased significantly, by virtue of the fact that it varies directly with the square root of the peak value, and inversely with the square root of the dispersion value. Furthermore, even within the waveguide medium, the pump optical pulse maintains a high coherency thereby enable to generate white light of a high coherency.

Embodiment No. 3

Figure 9:
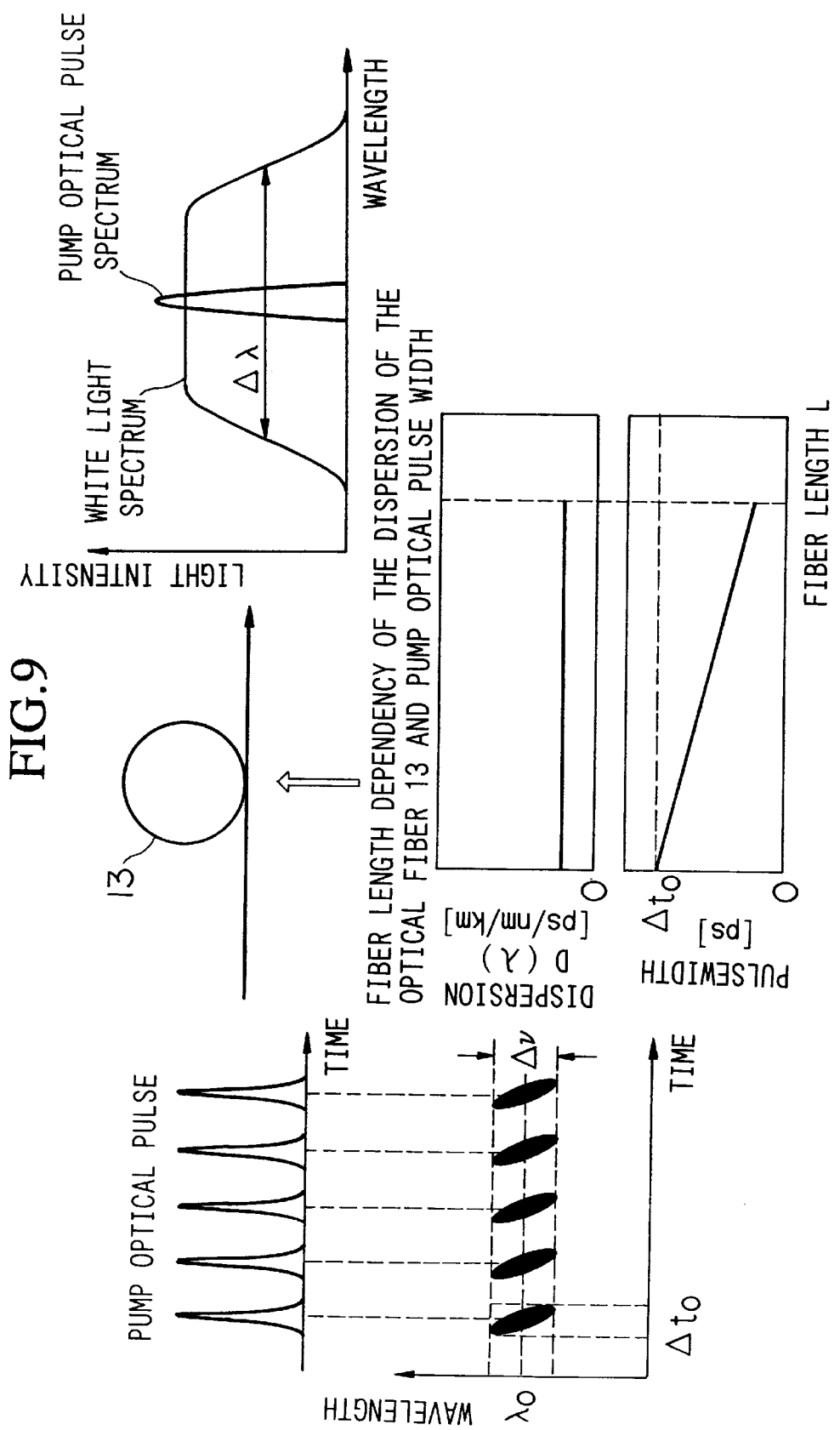
FIG. 9 is a schematic illustration of the pumping optical pulses and the optical spectrum of the white light generated from the source in Embodiment 3.

FIG. 9 illustrates the input pump optical pulse waveforms in the time-wavelength domain and output white light spectrum from a fiber waveguide 13 having a dispersion and pulse width variation in the propagation direction as illustrated.

The feature of this embodiment is that the pump optical pulse input into the optical fiber 13 exhibits a so-called chirping phenomenon in which the instantaneous optical frequency changes with time within the pulse. That is, when an optical fiber 13 has ordinary dispersion ($D(\lambda_0)<0$), pump optical pulses having the red-shift chirping is used. Within such a pulse, the instantaneous optical frequency changes from a high frequency (short wavelengths) to a low frequency (long wavelengths) in the direction of the leading to trailing edge of the pulse. In this case, because the group velocity of the long wavelengths is faster than that of the shorter wavelengths in the optical fiber 13, the long wavelength components catch up with the short wavelength components, thus compensating the red-shift chirping, and causing the pulses to be compressed.

When the optical fiber 13 exhibits anomalous dispersion ($D(\lambda_0)>0$), pump optical pulses having the blue-shift chirping is used, i.e. the instantaneous optical frequency changes from a low frequency (long wavelengths) to a high frequency (short wavelengths) in the direction of the leading edge to the trailing edge of a pulse. In this case, the group velocity of the short wavelength, in the optical fiber 13, is faster than that of the long wavelength, causing the short wavelength components to catch up with the long wavelength components, thus compensating the blue-shift chirping, and causing the pulses to be compressed. FIG. 9 shows the fiber-length-dependency of the dispersion of the optical fiber 13 and the pump optical pulse width showing the effect of pulse compression.

The pulse width $\Delta t_C$ of the compressed pump optical pulse in the optical fiber 13 is expressed as $\Delta t_C=0.44/\Delta v$ in [ps] for a Gaussian pulse where $\Delta v$ is the spectral bandwidth of the pulse in [THz]. Therefore, the peak power P inside the optical fiber 13 is given by:

$$P=\Delta t_0/\Delta t_C P_0=2.3\Delta t_0 \Delta v P_0 \tag{19}$$

The modification factor α is $2.3\Delta t_0 \Delta v$. For a sech²-type spectral shape, $\Delta t_C=0.315/\Delta v$ in [ps], and the peak power P is expressed as:

$$P = \Delta t_0 / \Delta t_C P_0 = 3.2 \Delta t_0 \Delta v P_0 \quad (20).$$

The modification factor $\alpha$ is $3.2\Delta t_0 \Delta v$. For a Lorentz-type spectral shape, $\Delta t_C = 0.11/\Delta v$ in [ps], and the peak power P is expressed as:

$$P = \Delta t_0 / \Delta t_C P_0 = 9.1 \Delta t_0 \Delta v P_0 \quad (21).$$

The modification factor $\alpha$ is $9.1\Delta t_0 \Delta v$. As seen, the modification factor varies with the spectral shape, but in this embodiment, the maximum value is taken as $\alpha = 9.1\Delta t_0 \Delta v$.

Embodiment No. 4

Figure 10:
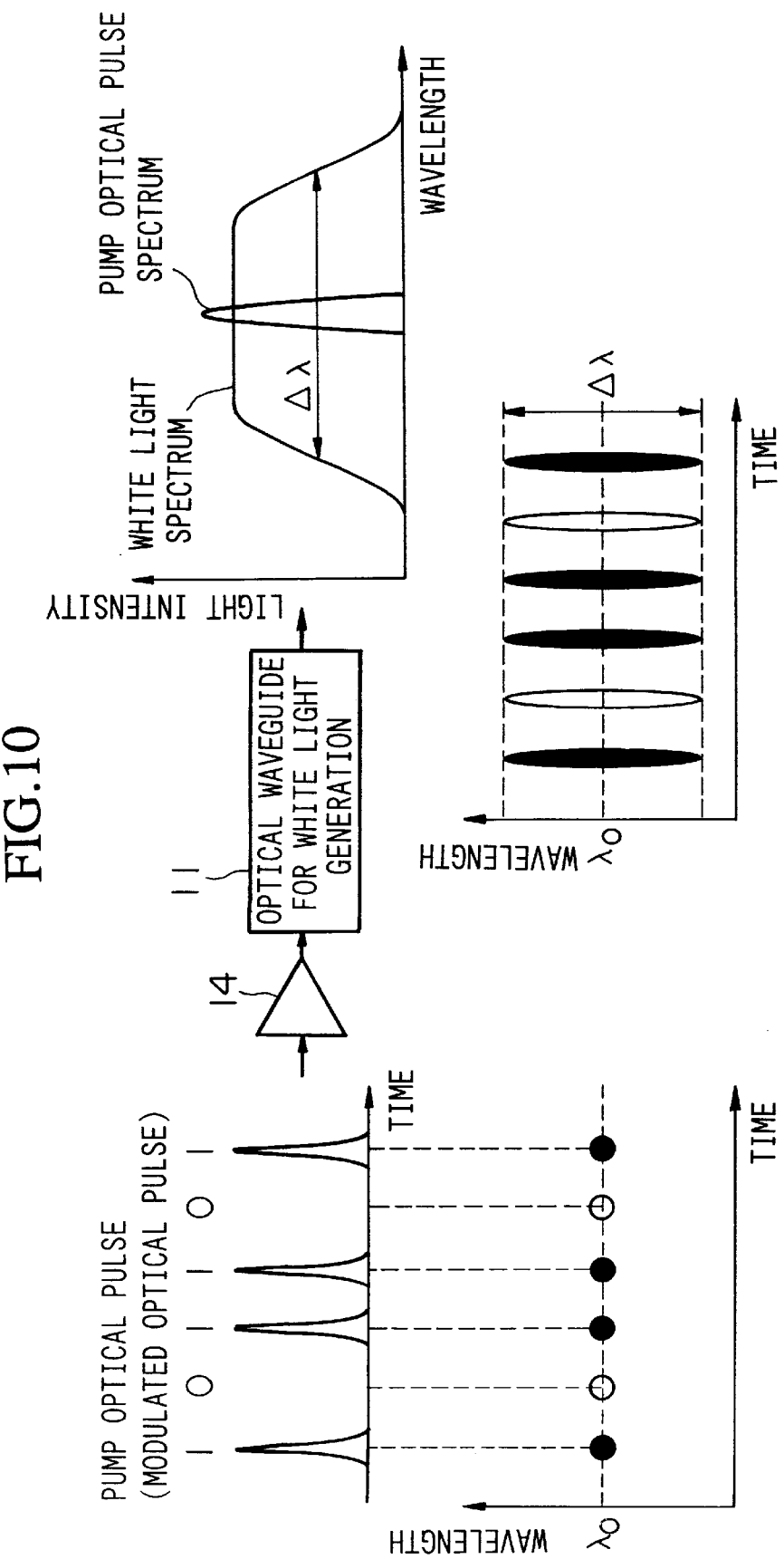
FIG. 10 is a schematic illustration of the pumping optical pulses and the optical spectrum of the white light generated from the source in Embodiment 4.

FIG. 10 illustrates the input and output pulse time-resolved spectral images of the coherent white light source of Embodiment 4.

The feature of the embodiment is that an optical amplifier 14 is inserted between the white light generation source (not shown) and the white light waveguide 11, and modulated optical pulses, as indicated in FIG. 10, are input as the pump optical pulse into the white light waveguide 11.

As seen in the figure, when the modulated optical pulse is amplified in the optical amplifier 14 and input into the white light waveguide 11, the modulated white light is generated as shown in FIG. 10, and also the spectral bandwidth of the white light $\Delta\lambda$ can be increased. The white light thus generated can be passed through an optical filter such as a bandpass optical filter or an arrayed waveguide filter, to separate a desired wavelength component, to effectively function as an optical frequency conversion circuit.

Embodiment No. 5

Figure 11:
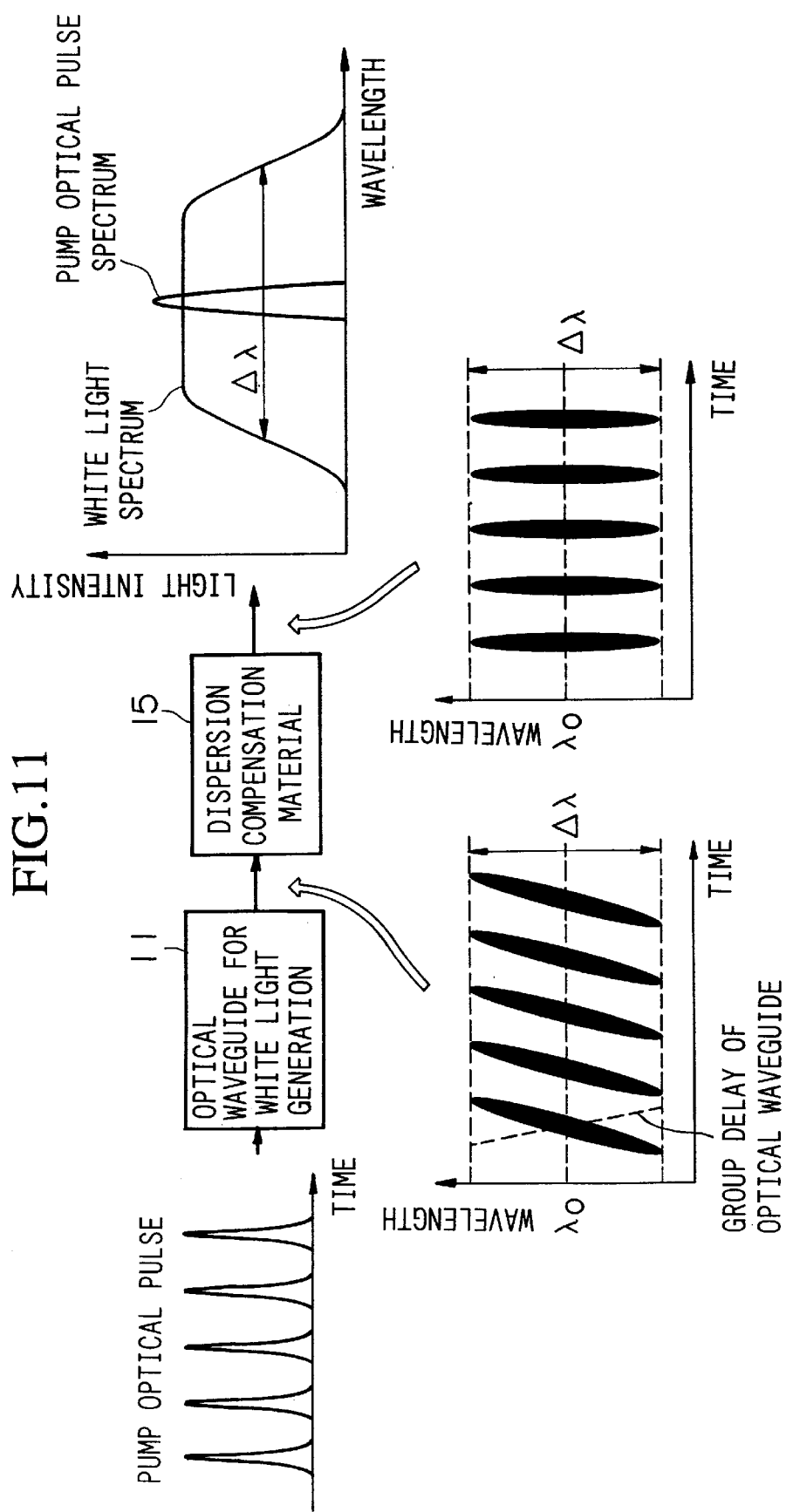
FIG. 11 is a schematic illustration of the pumping optical pulses and the optical spectrum of the white light generated from the source in Embodiment 5.

FIG. 11 illustrates the input and output pulse time-resolved images of the coherent white light source of Embodiment 5.

The coherent white light source of this embodiment features a dispersion compensation medium 15 coupled to the output end of the white light waveguide 11. The material for the medium 15 may be chosen from such materials as optical fibers, semiconductors and organic polymers.

The output light from the white light waveguide 11 exhibits chirping, as illustrated in FIG. 11, reflecting the group delay properties in the waveguide, and the dispersion compensation medium 15 compensates for the chirping. Because this white light is coherent, it can be filtered by using wavelength selective device (such as bandpass optical filters or arrayed waveguide grating optical filters), to obtain transform-limited optical pulses whose pulse widths will be determined by the bandwidth of the optical filter. Also, it is possible to simultaneously generate wavelength tunable pulses or multi-wavelength pulses of the order of pico to femto seconds.

Embodiment No. 6

Figure 12:
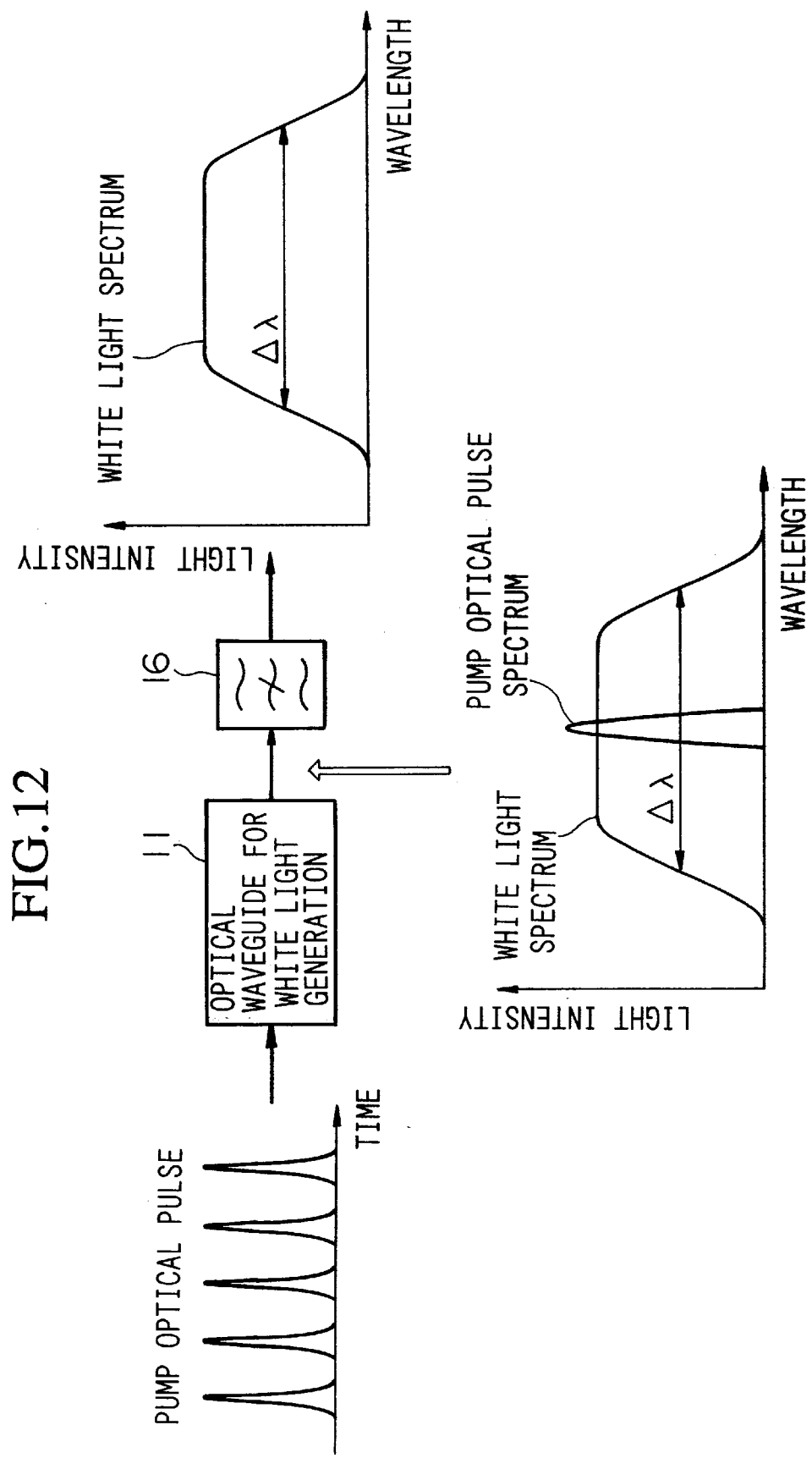
FIG. 12 is a schematic illustration of the pumping optical pulses and the optical spectrum of the white light generated from the source in Embodiment 6.

FIG. 12 shows a coherent white light source of Embodiment 6, and its output spectrum.

The feature of this embodiment is that a band rejection filter 16 is placed after the white light waveguide 11. In such a device, it is possible to eliminate only the high power pump optical pulses from the output white light.

Embodiment No. 7

Embodiments 7 to 13 presented in the following relate to examples of application of the coherent white light sources presented in Embodiments 1 to 6 to various optical devices.

Figure 13:
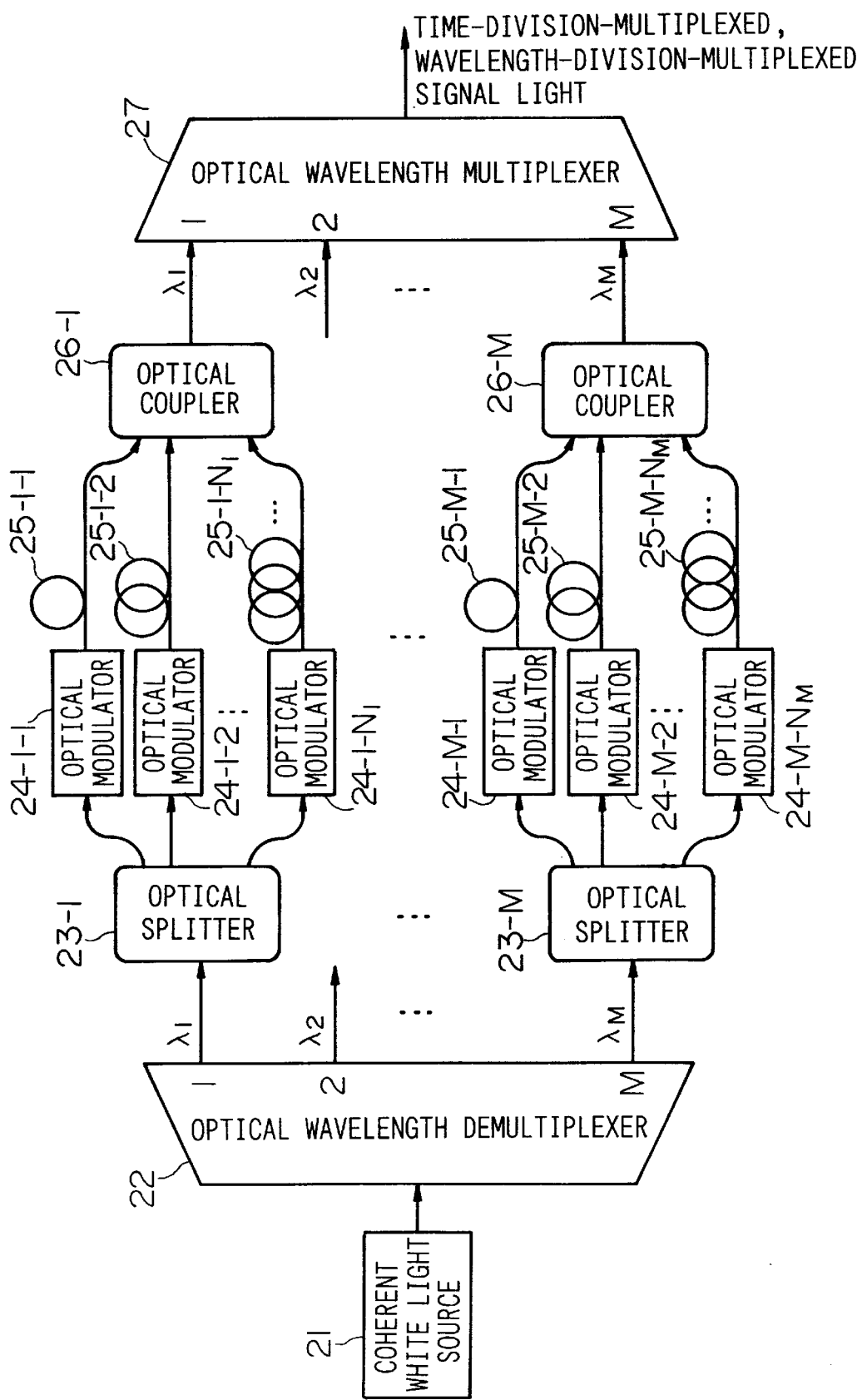
FIG. 13 is an example of the configuration of a TDM/WDM signal generation device in Embodiment 7.

FIG. 13 shows an application to a time-division multiplexing, wavelength-division multiplexing circuit.

The super-wideband white light output from the coherent white light source 21 is input into an input port of an optical wavelength demultiplexer 22.

Figure 14:
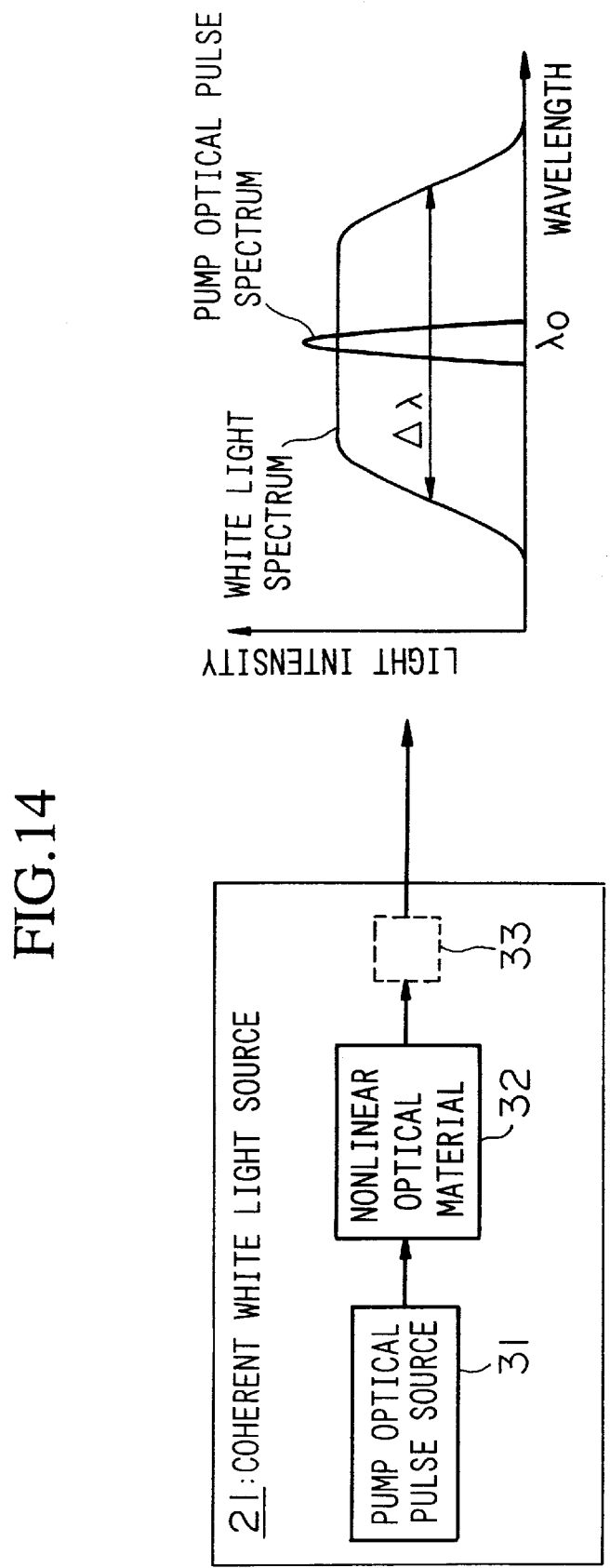
FIG. 14 is an example of a coherent white light source 21.

The coherent white light source 21 can be chosen from any one of the white light sources presented in Embodiments 1 to 6. As shown in FIG. 14, the basic configuration comprises pump light source 31 for generating pump optical pulses having the center wavelength at $\lambda_0$, and a white light waveguide 32 having a given amount of dispersion slope and dispersion, but band-rejection filter 33 (refer to Embodiment 6 for elimination of the excitation light output from the white light waveguide 32) may also be provided, as necessary. A dispersion compensation medium 15 (refer to Embodiment 5) may be placed after the white light waveguide or filter 33. It is also permissible to insert an optical amplifier between the pump light source 31 and the white light waveguide 32 (refer to Embodiment 4).

Returning to FIG. 13, the operation of the circuit will be explained. The optical wavelength demultiplexer 22 outputs an optical pulse group consisting of M pulses of individual wavelength components $\lambda_1, \lambda_2, \ldots, \lambda_M$ to individual output ports. An optical pulse at $\lambda_1$ is separated into $N_1$ pulses, in an optical splitter 23-1, and are input into corresponding one of optical modulators 24-1-1 to 24-1-$N_1$ to be modulated by respective electrical signals. Each modulated signal is input into their respective time delay devices 25-1 to 25-$N_1$ and are given a specific time delay for time-division multiplexing. The optical signal at $\lambda_1$ output from a time delay device is multiplexed, through an optical coupler 26-1, to generate a time-division multiplexed (TDM) signal at $\lambda_1$.

Similar processing takes places for other optical pulses at $\lambda_2, \ldots, \lambda_M$ output from the optical wavelength demultiplexer 22. For example, an optical pulse at $\lambda_M$ is separated into $N_M$ pulses in the optical splitter 23-M which are input into corresponding optical modulators 24-M-1 to 24-M-$N_M$ and are modulated by the respective electrical signals. Each modulated signal is input into a corresponding one of optical time delay devices 25-M-1 to 25-M-$N_M$ and is given a specific time delay for time-division multiplexing. The time-delayed signals output from the signal time delay devices are output through an optical coupler 26-M, to generate a TDM signal at $\lambda_M$.

Here, M, $N_1$ to $N_M$ are any natural numbers. An optical pulse at $\lambda_K$ is separated into $N_K$ pulses in a Kth optical splitter 23-K and is time-division multiplexed to $N_K$ signals in an optical coupler 26-K (where K is an natural number more than 1 and less than M). The bit rate of the TDM signals at $\lambda_K$ is $N_K \times B_0$ in [bit/s] where $B_0$ is the repetition frequency of the optical pulses output from the coherent white light source 21 given in [Hz]. It should be noted that different TDM signals at each wavelength can have a common bit rate. The relative time delay in each of the signal delay devices 25-K-1 to 25-K-$N_K$ is given by $D_K = J/(N_K \times B_0)$ in [s] where J is any integer.

The TDM signals output from M number of optical couplers 26-1 to 26-M at wavelengths $\lambda_1$ to $\lambda_M$ are input into an optical multiplexer 27 to be output as time-division multiplexed, wavelength-division multiplexed signals of an overall bit rate of $(N_1 + N_2 + \ldots + N_M) \times B_0$ in units of [bit/s].

For the optical wavelength demultiplexer 22 and optical wavelength multiplexer 27, diffraction grating or arrayed waveguide grating type multi/demultiplexer or other similar devices can be used. The configuration of the arrayed waveguide grating type multi/demultiplexer will be explained in more detail later. The maximum bit rate for the TDM signal $B_{max}$ in [bit/s] is determined by the pass-bandwidth $\Delta f$ in [Hz] which is a product of the bandwidths of the optical demultiplexer 22 and the optical multiplexer 27. Practically, it can be assumed to be $B_{max} \leq \Delta f$.

Figure 15:
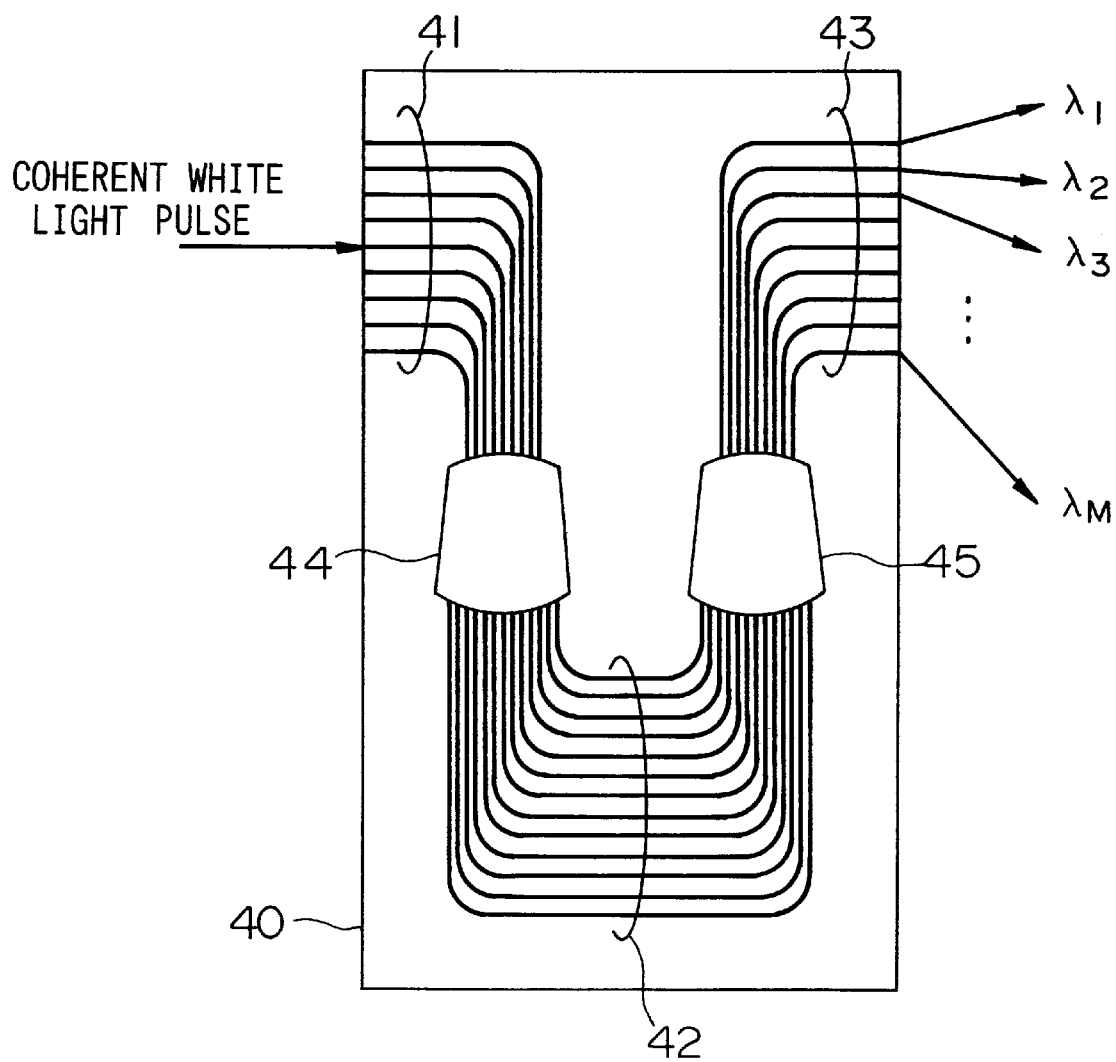
FIG. 15 is an example of an arrayed waveguide grating type wavelength multi/demultiplexer.

FIG. 15 shows an example of the arrayed waveguide grating type wavelength multi/demultiplexer.

The multi/demultiplexer comprises: a substrate 40; an input waveguide 41; an arrayed waveguide 42 consisting of multiple optical paths whose path length difference is chosen to be a specific amount; an input concave slab waveguide 44 optically connecting the input waveguide 41 to the arrayed waveguide 43; an concave slab waveguide 45 optically connecting the output waveguide 43 to the arrayed waveguide 42.

A coherent white optical pulse input into one of the input wave guides 41 is spatially spread out by diffraction in the input slab waveguide 44, and is guided to the arrayed waveguide 42 which is placed at right angles to the wavefront of the diffracted wave. Because the signal path length is made successively longer by a specific length $\Delta L$ from the input side to the output side of the arrayed waveguide 42, each of the optical signals arriving at the output slab waveguide 45 has been phase shifted by an amount corresponding to the path difference $\Delta L$. The phase-shift is dependent on the wavelength, and because of the lens-effect of the concave slab waveguide 45, different wavelengths are collimated at separate regions of the input terminal of the output waveguide 43. Therefore, an optical pulse arriving at each output port has a different wavelength, thus the arrayed waveguide 42 functions as an optical wavelength demultiplexer 22. When the line signals are input in the reverse direction, the arrayed waveguide 42 functions as an optical multiplexer 27.

Further, the bandwidth and the channel spacing of each wavelength are determined by the properties of the arrayed waveguide, and the optical pulse output to each of the output ports is a transform-limited pulse whose pulse width is determined by the bandwidth of the arrayed waveguide.

Embodiment No. 8

Figure 16:
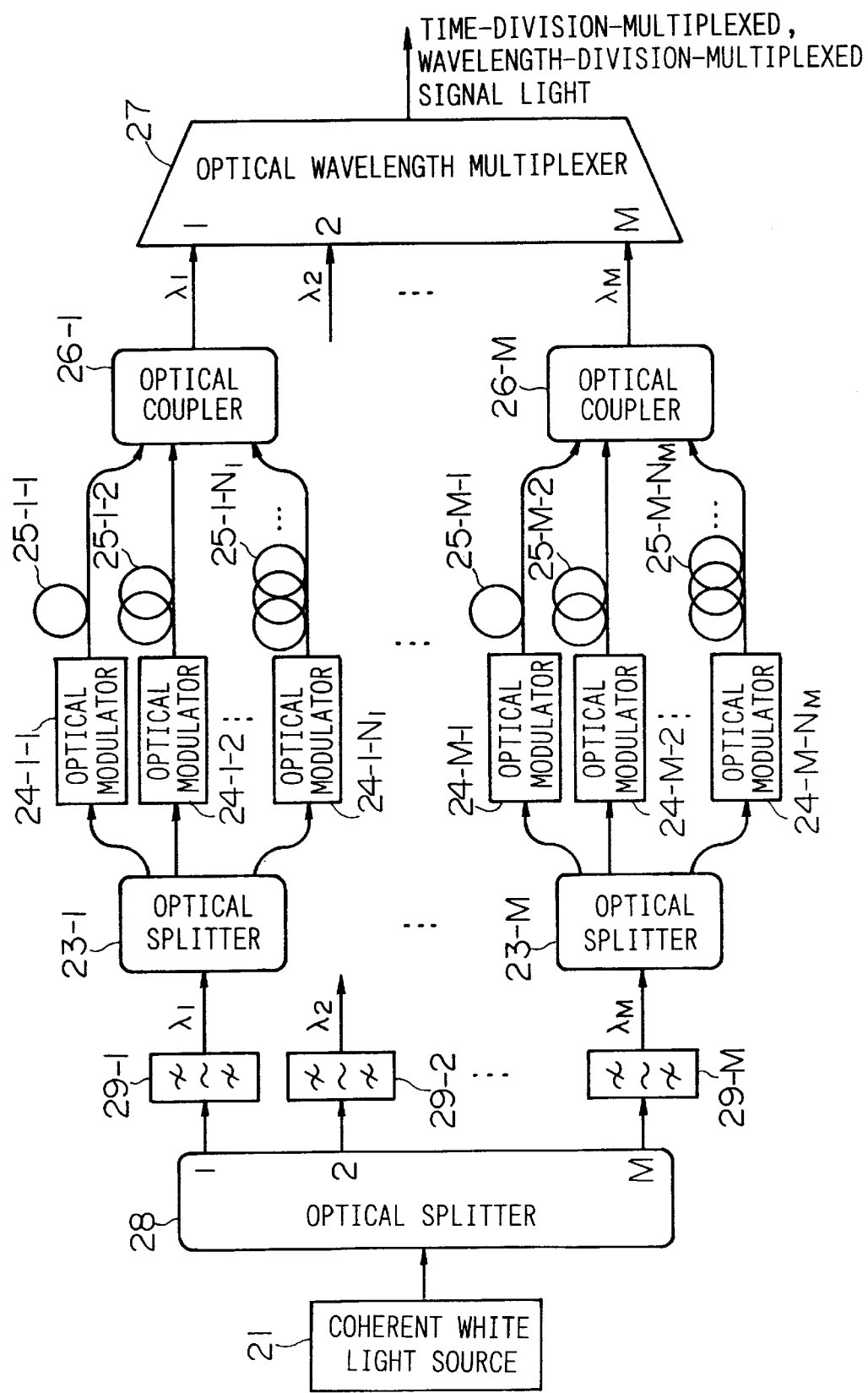
FIG. 16 is an example of the configuration of a TDM/WDM signal generation device in Embodiment 8.

FIG. 16 shows another application of the coherent white light source presented in Embodiments 1 to 6 having a different arrangement of the components from that of Embodiment 7.

The super-wideband coherent white pulse output from the coherent white light source 21 is input into an optical splitter 28 to generate M pulses. Each of the M white pulses input into wavelength selective devices 29-1 to 29-M is separated into wavelength components $\lambda_1, \lambda_2, \ldots, \lambda_M$. The bandwidth and the absolute wavelength produced in the wavelength selective devices can arbitrarily be selected so that any center wavelength having any pulse width can be obtained. In this case, the wavelength selective device 29-1 outputs an optical pulse at $\lambda_1$ which is input into the optical splitter 23-1, the output $N_1$ pulses are separately input into optical modulators 24-1 to 24-1-$N_1$ and are modulated by the respective electrical signals. Each of the modulated signal is input into optical time delay devices 25-1-1 to 25-1-$N_1$ and is given a specific times delay for time-division multiplexing. Each of the time-delayed modulated signals is input into an optical coupler 26-1 and is output as TDM signals at $\lambda_1$.

Similar processing takes places for other optical pulses at $\lambda_2, \ldots, \lambda_M$ output from the wavelength selection devices 29-2 to 29-M. For example, an optical pulse at $\lambda_M$ is separated into $N_M$ pulses in the optical splitter 23-M which are input into corresponding optical modulators 24-M-1 to 24-M-$N_M$ and are modulated by the respective electrical signal. Each modulated signal is input into a corresponding one of optical delay devices 25-M-1 to 25-M-$N_M$ and is given a specific time delay for time-division multiplexing. Each of the time-delayed signals output from the optical time delay devices is output through an optical coupler 26-M, to generate a TDM signal at $\lambda_M$. The number of multiplexing of each wavelength is the same as that in Embodiment 1. A common bit rate for TDM signals at each wavelength may be used.

The TDM signals output from M number of optical couplers 26-1 to 26-M at wavelengths $\lambda_1$ to $\lambda_M$ are input into an optical wavelength multiplexer 27 to be output as time-division multiplexed, wavelength-division multiplexed signals of an overall bit rate of $(N_1+N_2+ \ldots +N_M) \times B_0$ in units of [bit/s]. The maximum bit rate for the TDM signal $B_{max}$ in [bit/s] is determined by the bandpass widths $\Delta f$ in [Hz] which is a product of the bandwidths of the wavelength selection devices 29-1 to 29-M and the optical wavelength multiplexer 27. In practice, it can be assumed to be $B_{max} \leq \Delta f$.

Embodiment No. 9

Figure 17:
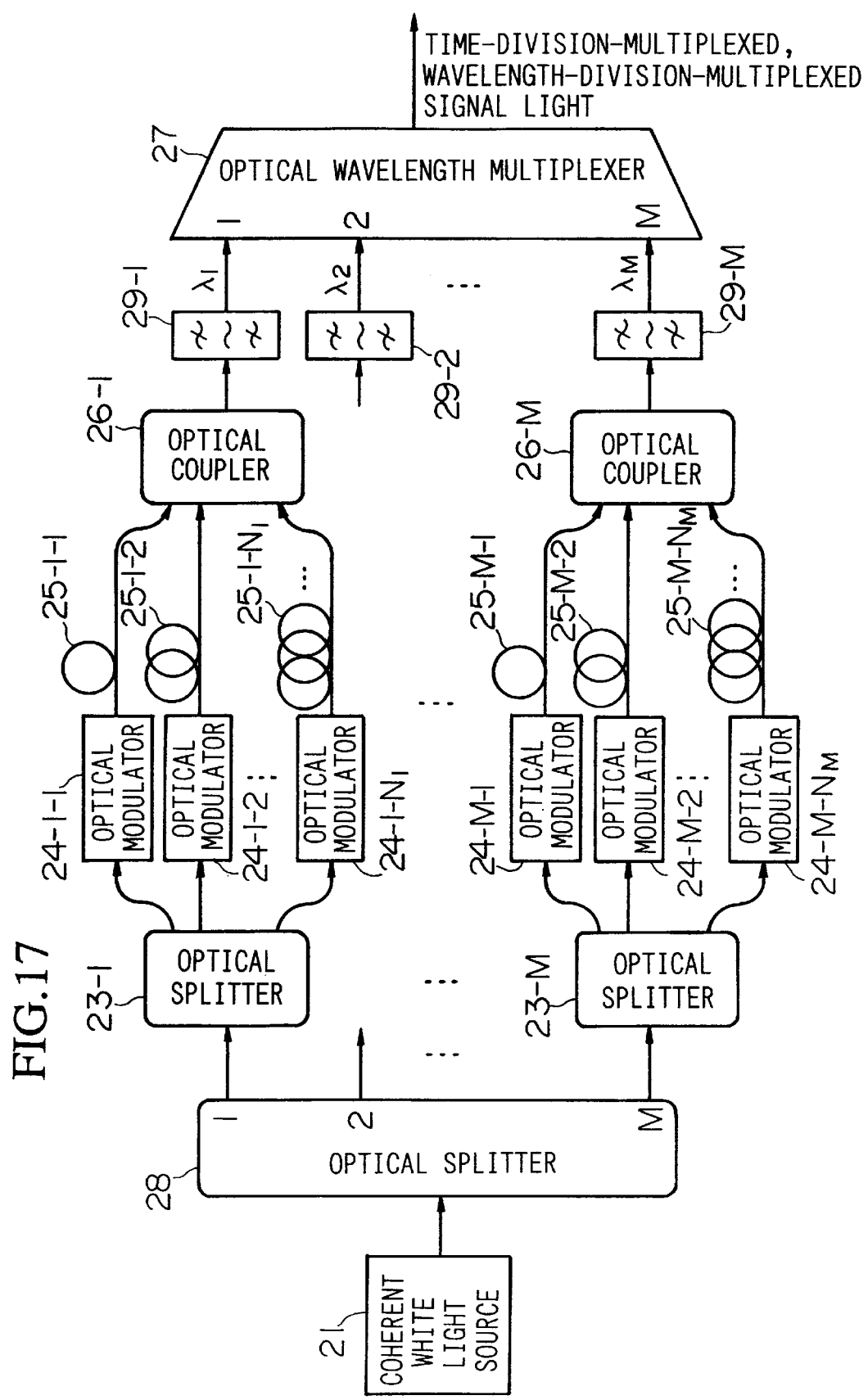
FIG. 17 is an example of the configuration of a TDM/WDM signal generation device in Embodiment 9.

FIG. 17 shows another application to time-division multiplexed, wavelength-division multiplexed (TDM/WDM) signal generation device using the coherent white light source presented in Embodiments 1 to 6.

In the TDM/WDM device of this embodiment, the wavelength selective devices 29-1 to 29-M are placed further downstream in the transmission path of the optical couplers 26-1 to 26-M. The operation of the TDM/WDM device is the same as that for Embodiment 8. It should be noted that the optical splitter 28 and the optical splitters 23-1 to 23-M for the respective wavelengths need not be arranged in two-stages, it is only necessary that overall there is one input and $(N_1+N_2+ \ldots +N_M)$ output.

Also, in Embodiments 7 to 9 presented above, an optical coupler may be used in place of the optical wavelength multiplexer 27. In such a case, referring to FIG. 15 of Embodiment 7 and FIG. 16 in Embodiment 8, the optical couplers to replace the optical couplers 26-1 to 26-M for the respective wavelengths and the optical wavelength multiplexer 27 need not be arranged in two-stages, and it is necessary that there is $(N_1+N_2+ \ldots +N_M)$ input and one output in the overall system.

Also, referring to FIG. 16 in Embodiment 8 and FIG. 17 in Embodiment 9, the wavelength selective devices 29-1 to 29-M may be wavelength tunable. However, in such a case, it is necessary to replace the optical wavelength multiplexer 27 with an optical coupler which is wavelength-independent.

Referring to FIG. 13 in Embodiment 7, if an arrayed waveguide grating type multi/demultiplexer is used for the optical demultiplexer 22, it is possible to obtain cyclic shifting of output wavelengths from the respective output ports by shifting the input port for the coherent white input pulse. In Embodiments 7 to 9, it should also be noted that the positions of the optical modulator 24 and the signal delay device 25 may be interchanged.

Embodiment No. 10

FIG. 18 shows an application of the coherent white light source presented in Embodiments 1 to 6 to an optical pulse shaping device. An optical modulated input signal 51 output from a pump optical pulse source (not shown) is amplified sufficiently in an optical amplifier 52, and is input into a white light waveguide 53. In the waveguide 53, coherent white light of uniform optical power is generated over a spectral bandwidth $\Delta\lambda$. The generated white light is input to optical filters 54 with amplitude and phase transmittance (complex amplitude filter), and the output spectra are filtered with any amplitude and phase-transmittance to produce optical pulses having corresponding temporal profile. Because the white light output from the white light waveguide 53 has a uniform amplitude and phase for any given wavelength, the temporal intensity waveform of the reshaped optical pulse is given by a square of the Fourier transform of the amplitude and phase-transmittance of the complex amplitude filter. Conversely, therefore, if a reshaped temporal intensity waveform of $f^2(t)$ is required, a complex amplitude filter having a spectral transmittance of $F(\omega)$=Fourier Transform$\{f(t)\}$ should be used. For example, if a square waveform expressed as:

$$f(t)=1 \quad (-a \leq t \leq a) \tag{22}$$

is required, the amplitude and phase-transmittance $F(\omega)$ of the complex amplitude filter should satisfy a sinc function given by the Fourier transform of $f(t)$:

$$F(\omega) \propto \sin(a(\omega-\omega_0))/(a(\omega-\omega_0)) \tag{23}$$

wherein $\omega$ is an angular frequency and $\omega_0$ is a central angular frequency. By selecting $\omega_0$, it is possible to obtain a square pulse having any center wavelength. Table 1 shows typical temporal intensity waveforms, and the necessary amplitudes and phase-transmittance $F(\omega)$.

responding output auto-correlation waveform. In spite of the fact that the bandwidths of the optical filters in both cases are about the same, the output waveforms are different in time domain (showing different pulse width and time-bandwidth product), thus verifying the pulse reshaping performance of the circuit.

Embodiment No. 11

Figure 20:
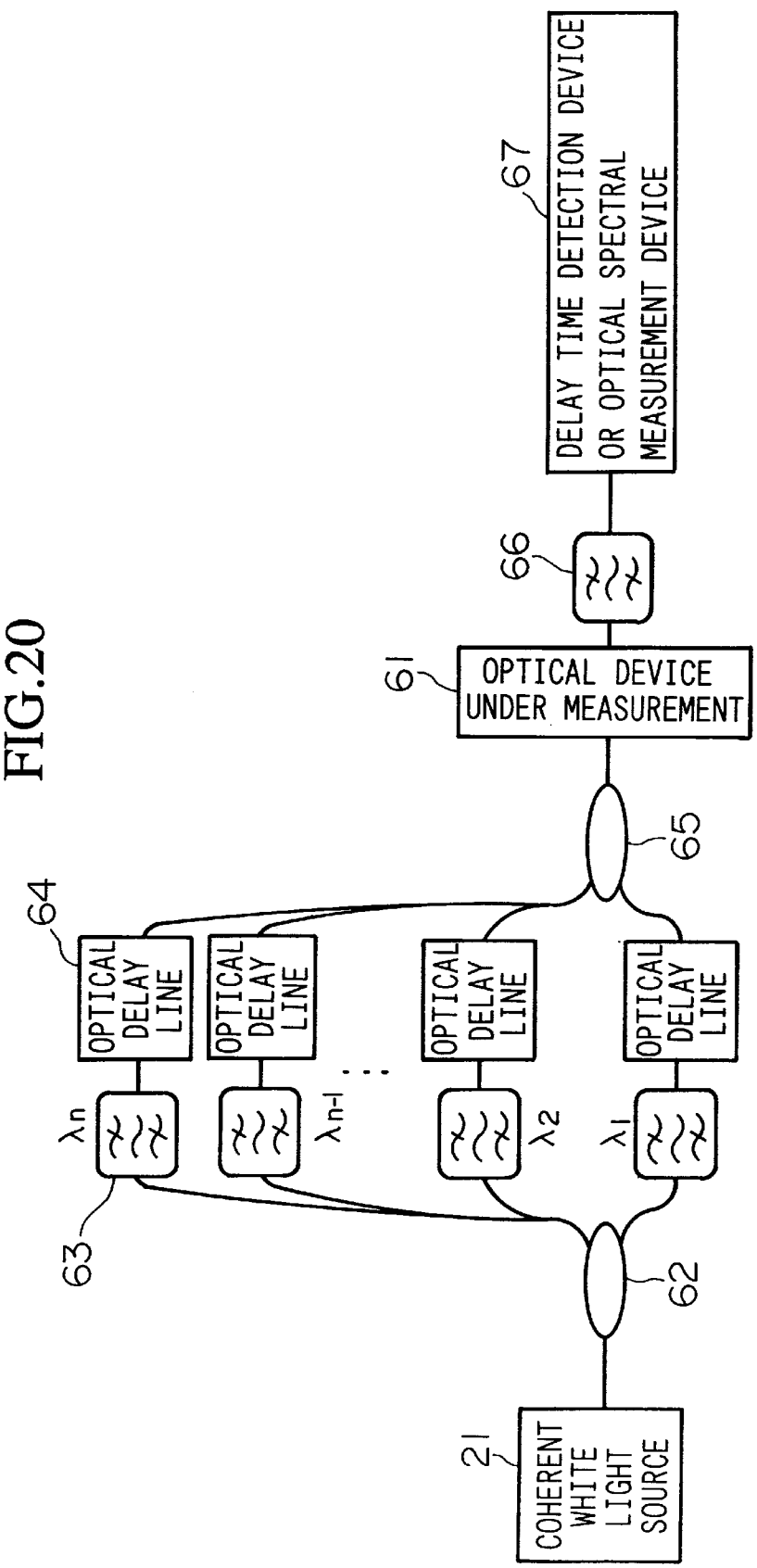
FIG. 20 is an example of the configuration of the optical device measuring apparatus in Embodiment 11.

FIG. 20 shows another application of the coherent white light source presented in Embodiments 1 to 6. Coherent white light generated from the coherent white light source 21 is separated into n (a natural number) pulses in an optical splitter 62, and a wavelength component is selected therefrom by wavelength selective devices 63, and each pulse is delayed in a optical time delay device 64, and again combined into a single train in an optical coupler 65. The combined coherent white light is input into an optical device under measurement 61 from which a specific wavelength component is selected by a wavelength selective device 66 which is then input into a delay time detection device or an optical spectral measurement device 67, thereby measuring a delay time for each pulse at a wavelength component or spectral properties. The optical delay device may be a semiconductor optical detector or a streak camera, and optical spectral measuring device may be an optical wavelength demultiplexer or a Fabry-Perot filter.

By using the measuring system shown in FIG. 20, it is possible to determine the wavelength-dependency of the optical device under measurement 61 (group delay characteristics) with the use of the optical delay measuring device as demonstrated above, or to determine the wavelength-dependency of the temporal-response property of a nonlinear phenomenon with the use of the optical spectral measuring device. When measuring the group delay

TABLE 1

| temporal intensity $f^2(t)$ waveform | necessary amplitude and phase transmittance |
|---|---|
| $e^{-4\ln2\left(\frac{t}{\Delta t}\right)^2}$ | $e^{-\frac{1}{\sin2}((\omega-\omega_0)\Delta t)^2}$ |
| $\text{sech}^2\left(1.76\dfrac{t}{\Delta t}\right)$ | $\text{sech}\left(5.60\left(\dfrac{(\omega-\omega_0)\Delta t}{2\pi}\right)\right)$ |
| $\dfrac{1}{\left\{1+\left(\dfrac{2t}{\Delta t}\right)^2\right\}}$ | $e^{\pm\frac{1}{2}(\omega-\omega_0)\Delta t}$ |
| $e^{-2\ln2\left\|\frac{t}{\Delta t}\right\|}$ | $\dfrac{1}{\left\{1+\left(\dfrac{(\omega-\omega_0)\Delta t}{\ln 2}\right)^2\right\}}$ |
| $e^{-\ln2\frac{t}{\Delta t}}, \; t>0$ | $\dfrac{1}{\left\{1+j\dfrac{2(\omega-\omega_0)\Delta t}{\ln 2}\right\}}$ |

Figure 19A:
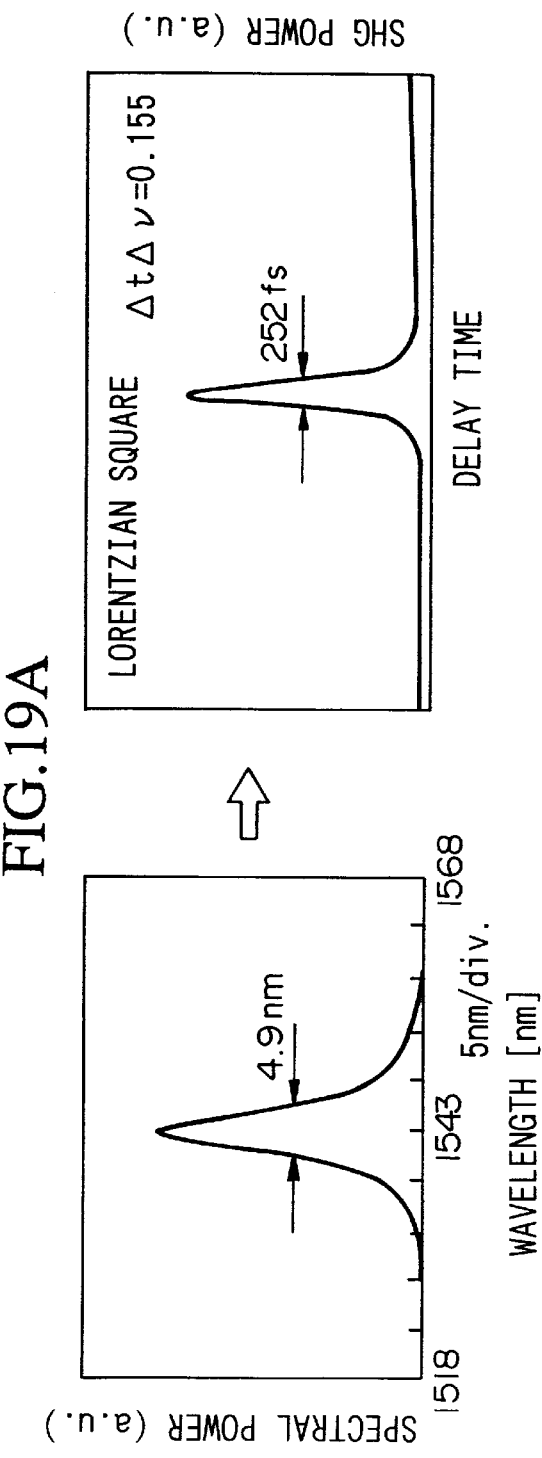
FIG. 19A and FIG. 19B show the results of pulse shaping by the apparatus in Embodiment 10.
Figure 19B:
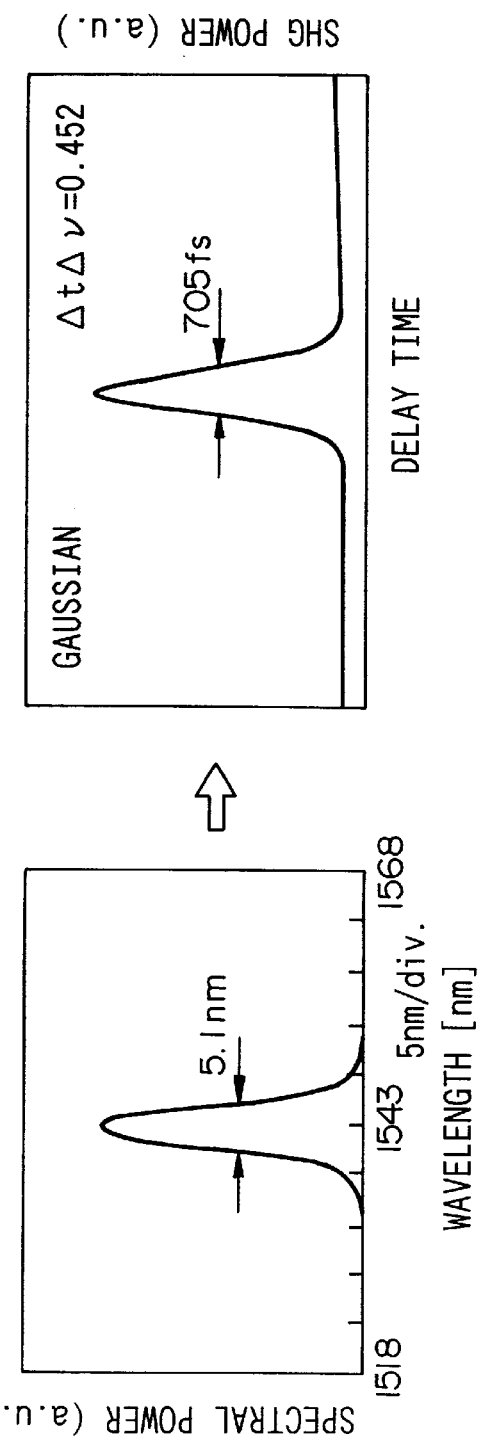

Next, an example of a waveform reshaping is shown in FIGS. 19A and 19B. Reshaped pulse are obtained by passing the coherent white light generated from the coherent white light source 21 through two kinds of tunable bandpass optical filters both having a bandwidth of about 5 nm. FIG. 19A shows a case for a Lorentz type spectral shape with corresponding output auto-correlation waveform. FIG. 19B shows a case for a Gaussian-type spectral shape with corcharacteristics, the same effect is obtained by placing the target device adjacently in front of the optical splitter 62. Also, it is permissible to eliminate at least one optical delay device from n number of optical delay devices 64. Also, the wavelength selective device 66 may be a bandpass optical filter or a multiple-output optical wavelength demultiplexer.

Figure 21:
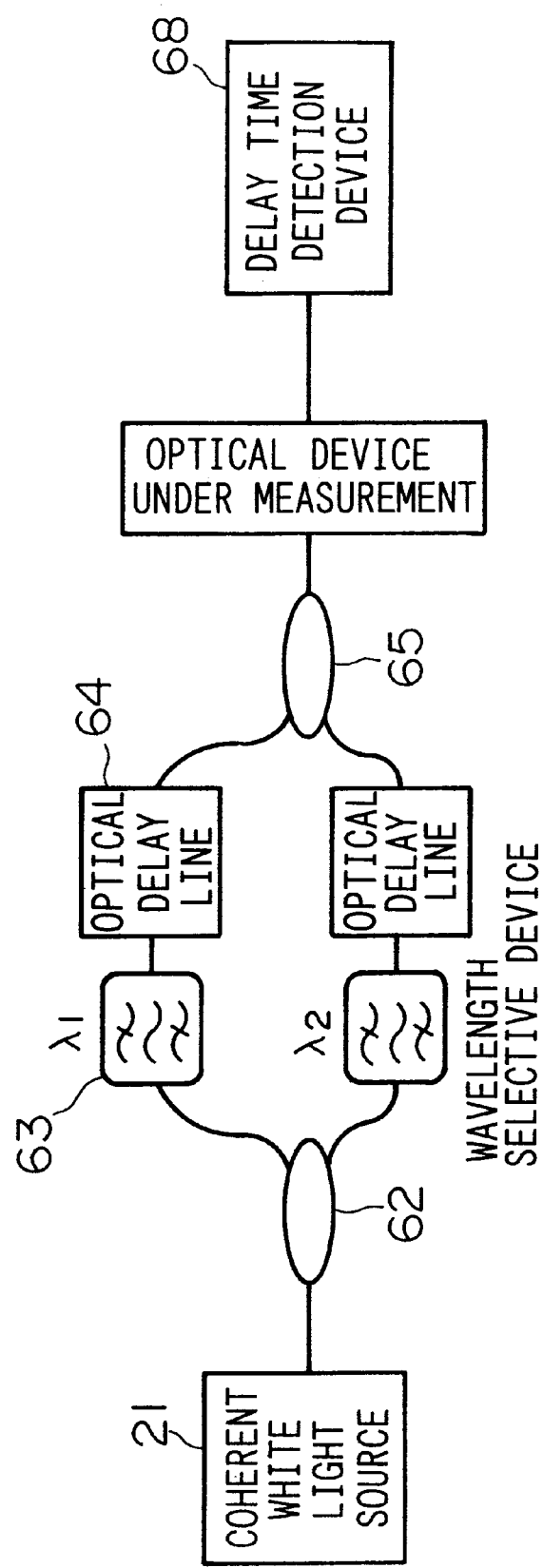
FIG. 21 is an example of the configuration of the wavelength dispersion measuring apparatus in Embodiment 12.

FIG. 21 shows an application of the coherent white light source presented in Embodiments 1 to 6 to a wavelength dispersion measuring system. The wavelength dispersion measuring system is based on Embodiment 11 apparatus when the two pulses are produced by the optical splitter 62. The system comprises: a coherent white light source 21; an optical splitter 62; two wavelength selection devices 63; two optical delay devices 64; an optical coupler 65 and the optical device under measurement and a delay time measuring device 68. The system shown in FIG. 21 determines the group delay characteristics of the whole optical system $\tau(\lambda)$, including the target measuring device, from the difference $\tau(\lambda_1)-\tau(\lambda_2)$ where one of the wavelengths ($\lambda_1, \lambda_2$) is fixed and the other is made variable. The group delay characteristics of the target device $\tau_d(\lambda)$ is obtained by subtracting the group delay characteristics of only the measuring system $\tau_m(\lambda)$ from that of the whole optical system $\tau(\lambda)$. The delay characteristics of the measuring system $\tau_m(\lambda)$ can be obtained using the system shown in FIG. 21 without the target measuring device.

Also, the optical delay device 64 may not be needed in general, but if a signal superposition occurs, i.e. $\tau(\lambda_1)-\tau(\lambda_2)$ becomes concurrent in the time-domain, then the optical delay device 64 is adjusted so that $\tau(\lambda_1)-\tau(\lambda_2)\neq 0$ for all wavelengths.

Embodiment No. 13

Figure 22:
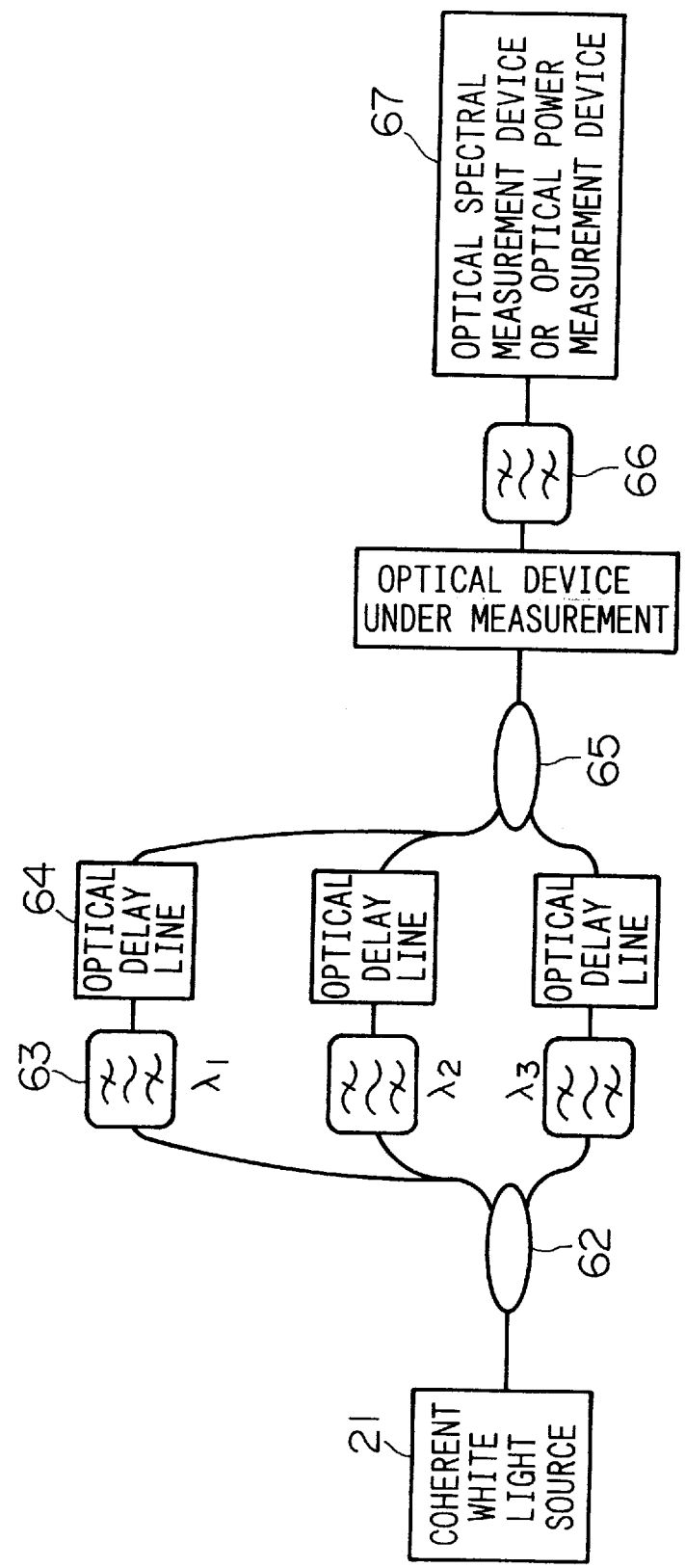
FIG. 22 is an example of the configuration of the nonlinear response measuring apparatus in Embodiment 13.
Figure 23:
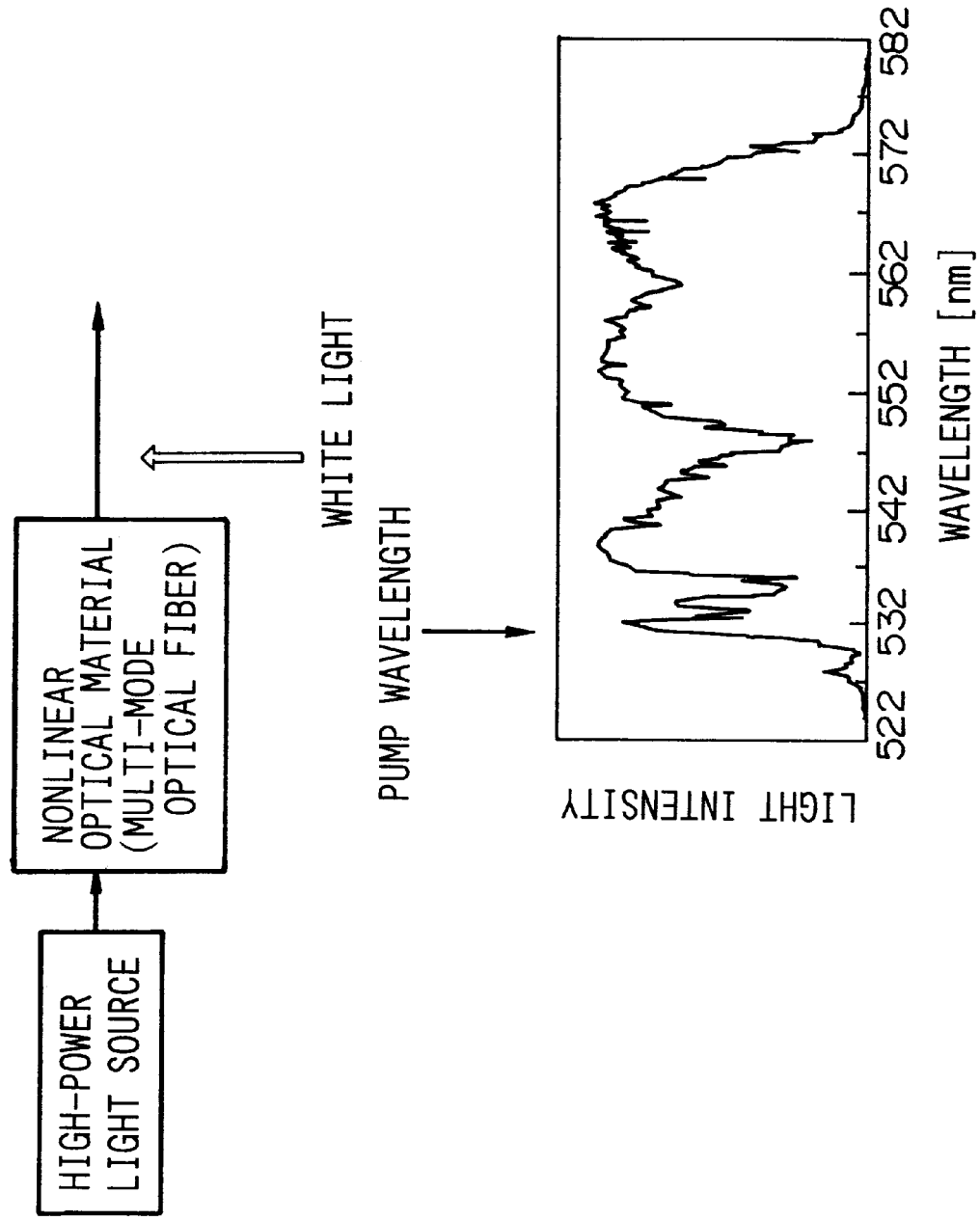
FIG. 23 is a schematic illustration of a conventional white light spectrum.
Figure 24:
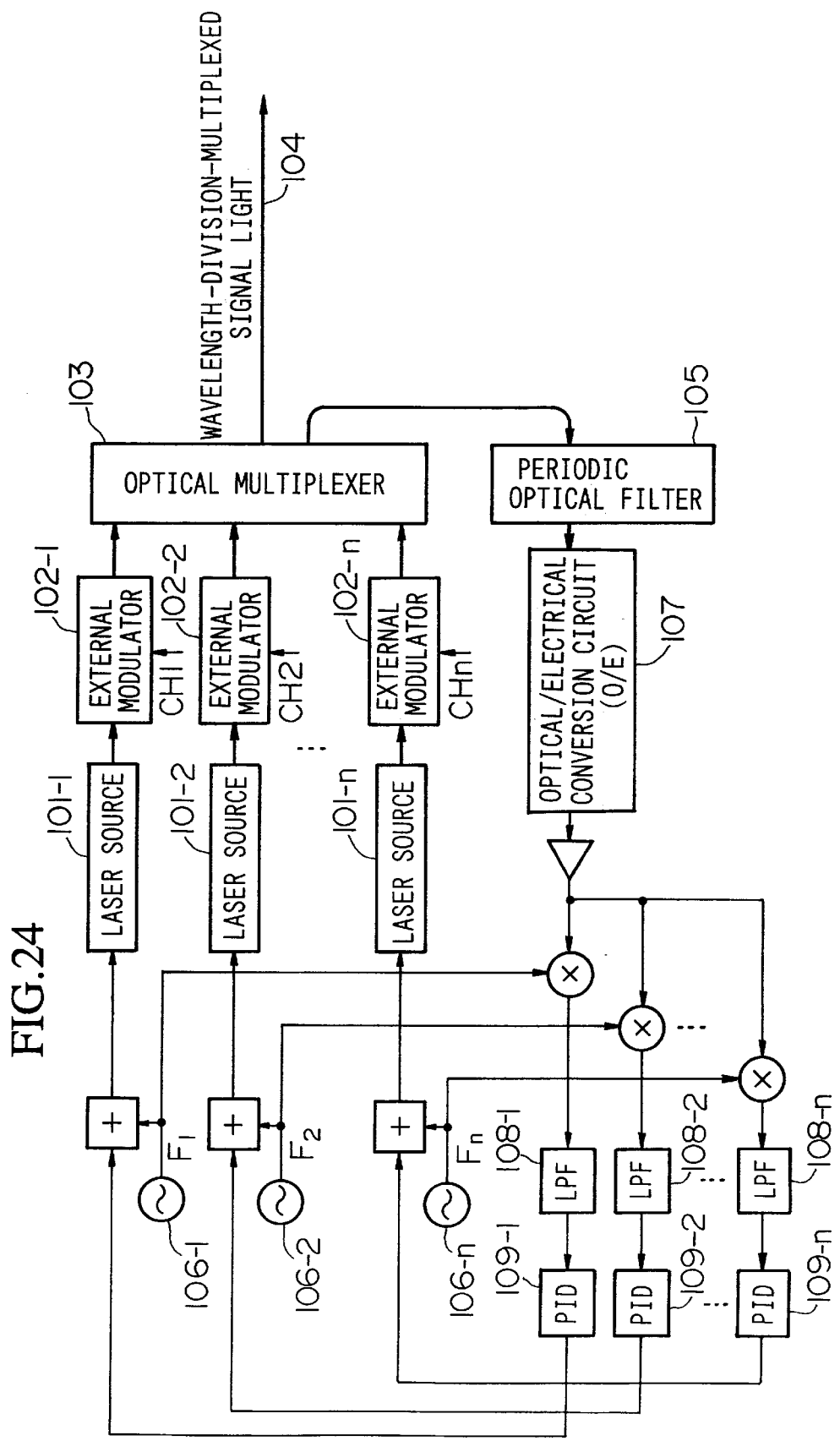
FIG. 24 is an example of the configuration of a conventional WDM signal generation apparatus.

FIG. 22 shows an application of the coherent white light source presented in Embodiments 1 to 6 to a nonlinear response measuring system. The nonlinear response measuring system corresponds to a case of n=3 for the optical splitter 62 in the device presented in Embodiment 11.

The nonlinear response measuring system comprises: a coherent white light source 21; an optical splitter 62; three wavelength selective devices 63; an optical delay device 64 for each wavelength; an optical coupler 65; a wavelength selective device 66; the optical device under measurement; and an optical spectral measuring device or an optical power measuring device 67. The white light separated into three pulses by the optical splitter, each of which enters the wavelength selective device 63 and the optical delay device 64 to be provided with a given wavelength component and delay times, and again combined into a single train in the optical coupler 65 and is input into the optical device under measurement. In the optical device under measurement, the wavelength components of the FWM-light generated by the parametric four-wave mixing process of the three wavelength components are selected in the wavelength selective device 66, and the resulting spectral distribution is measured to determine an optical power of a specific wavelength component as a function of the relative time-delay differences among the three wavelength components. When measuring the response-time of a degenerate FWM-light, the number of degenerate waves should be matched by selecting appropriate number of pulses n in the optical splitter. For example, if two waves are degenerate, a selection is made so that n=2. An advantage of the measuring device is that the response-time can be measured using different ultra-short pulses free from relative timing jitters, and it is particularly effective in measuring response times of less than picoseconds.

In the various optical measuring systems presented in Embodiments 11 to 13, it is permissible to interchange the location of the wavelength selection device 63 and the optical time-delay device 64.

What is claimed is:

1. A coherent white light source comprising:
   pump optical pulse generation means for generating pump optical pulses having a wavelength $\lambda_0$; and
   optical waveguide means for propagating said pump optical pulses generated by said pump optical pulse generation means and generating white pulses having a wavelength range $\Delta\lambda$ centered about a center wavelength at $\lambda_0$;
   wherein said waveguide means is provided with a dispersion value and a dispersion slope so as to produce a four-wave mixing light with a wavelength $\lambda_0\pm\Delta\lambda/2$, and a path length so that an optical power gain of said four-wave mixing-light is not less than one;
   wherein said path length of said waveguide means is not less than a length given by:
   $\ln G_0/(2|\gamma|P)$ in units of [km] and an absolute value of said dispersion slope is not more than a value given by:
   $16(|\gamma|E)/(\Delta\lambda^2\ln G_0)$ in units of [ps/nm$^2$/km] and an absolute value of said dispersion at said wavelength $\lambda_0$ is not more than a value given by:
   $(16/\Pi c)/\lambda_0^2|\gamma|P/(\Delta\lambda)^2$ in units of [ps/nm/km] where $\gamma$ is a third-order nonlinear coefficient; E is an energy per one pump optical pulse; P is the peak power of a pump optical pulse which is given by $P=\alpha P_0$, where $\alpha$ is a modification factor, and $P_0$ is the peak power of a pump optical pulse input into said waveguide; $G_0$ which is not less than two is an optical power gain of four-wave mixing light, and c is a speed of light in a vacuum.

2. A coherent white light source as claimed in claim 1, wherein said pump optical pulse is an Nth-order soliton for said waveguide means having a modification factor $\alpha$ given by 1.2 N.

3. A coherent white light source as claimed in claim 1, wherein an absolute value of said dispersion value in said wavelength means at said wavelength $\lambda_0$ decreases in a direction of light propagation, wherein said modification factor $\alpha$ is given by $|D_{max}(\lambda_0)/D_{min}(\lambda_0)|$ wherein $|D_{max}(\lambda_0)|$ is the maximum absolute value of dispersion within said waveguide means and $|D_{min}(\lambda_0)|$ is the minimum absolute value of dispersion within said waveguide means and the dispersion properties are defined by $D_{max}(\lambda_0)\tau>0$, and $D_{min}(\lambda_0)\tau>0$.

4. A coherent white light source as claimed in claim 3, wherein an absolute value of said dispersion value at said wavelength $\lambda_0$ of said waveguide means decreases monotonically in a direction of light propagation.

5. A coherent white light source as a claimed in claim 1, wherein said pump optical pulse generation means is a mode-locked fiber ring laser.

6. A coherent white light source as claimed in claim 1, wherein said pump optical pulse generation means is a mode-locked semiconductor laser.

7. A coherent white light source as claimed in claim 1, wherein said pump optical pulse generation means is a gain switched semiconductor laser.

8. A coherent white light source as claimed in claim 1, wherein said pump optical pulse generation means is an optical pulse generator using electro-absorption modulator.

9. A coherent white light source as claimed in claim 1, wherein said pump optical pulse is selected to exhibit a red-shift chirping when a dispersion at a pump wavelength in said waveguide means has normal dispersion, and said pump optical pulse is selected to exhibit a blue-shift chirping when a dispersion at a pump wavelength in said waveguide means has anomalous dispersion, and wherein a modification factor is not more than a value given by $9.1\Delta t_0\Delta v$ where $\Delta t_0$ is a pulse width of a pump optical pulse and $\Delta v$ is a spectral bandwidth of said pump optical pulse.

10. A coherent white light source as claimed in claim 1, wherein an optical amplifier is provided between said pump optical pulse generation means and said waveguide means.

11. A coherent white light source as claimed in claim 1, wherein a dispersion compensation device is connected at an output end of said waveguide means for compensating dispersion in said waveguide means.

12. A coherent white light source as claimed in claim 1, wherein an optical band-rejection filter is provided at an output end of said waveguide means for eliminating pump optical pulses output from said waveguide.

13. A time-division multiplexed, wavelength division multiplexed signal generation apparatus comprising:
   coherent white light source as claimed in one of claims 1 or 12;
   optical wavelength demultiplexing means for receiving coherent white light output from said coherent white light source and for separating the coherent white light into a plurality of optical pulses having different wavelengths;
   an optical splitting means provided for each of said different wavelengths for distributing said plurality of optical pulses into respective optical paths;
   an optical modulator provided for each of said plurality of optical paths for modulating said plurality of optical pulses output from said optical splitting means;
   an optical delay means provided for each of said optical modulators for assigning a delay time specific to each modulated optical signal output from said optical modulators; and
   optical coupling means for coupling optical signals output from said optical delay means, and for outputting time-division multiplexed, wavelength-division multiplexed optical signals.

14. A time-division multiplexed, wavelength division multiplexed signal generation apparatus as claimed in claim 13, wherein said optical wavelength demultiplexing means is replaced with:
   optical splitting means for receiving said coherent white light for distributing to a plurality of optical paths; and
   wavelength selection means for selecting a different wavelength component from each of a plurality of coherent white pulses for forwarding to optical splitting means provided for different wavelengths.

15. A time-division multiplexed, wavelength division multiplexed signal generation apparatus as claimed in claim 14, wherein a location of said optical modulating means and said optical delay means is interchanged.

16. A time-division multiplexed, wavelength division multiplexed signal generation apparatus as claimed in claim 13, wherein a location of said optical modulating means and said optical delay means is interchanged.

17. A time-division multiplexed, wavelength division multiplexed signal generation apparatus comprising:
   coherent white light source as claimed in one of claims 1 to 12;
   optical splitting means for receiving coherent white light output from said coherent white light source, wherein each optical splitting means distributes the coherent white light to a plurality of optical paths;
   an optical modulator provided for each of said optical paths for modulating light output by the plurality of optical paths by respectively different electrical signals;
   an optical delay means provided for each of said optical modulators for assigning a time delay specific to each modulated optical signal output from said optical modulators;
   m units of optical coupling means for coupling a predetermined number of optical signals from among the plurality of optical signals output from said optical delay means, and for outputting time-division multiplexed optical signals;
   a wavelength selection means provided for each of said optical coupling means for selecting predetermined wavelength componenents from the time-division multiplexed optical signal output from the optical coupling means; and
   an optical multiplexing means for multiplexing the time-division multiplexed optical signals output from said wavelength selection means, and for outputting time-division wavelength-division multiplexed optical signals.

18. A time-division multiplexed, wavelength division multiplexed signal generation apparatus as claimed in claim 17, wherein a location of said optical modulating means and said optical delay means is interchanged.

19. An optical pulse shaping apparatus comprising:
   a coherent white light source as claimed in one of claims 1 to 12; and
   an optical filter with complex amplitude transmittance for generating coherent white light, from white light pulses output from said coherent white light source.

20. An optical device evaluation system, for determining an optical performance of an optical device under measurement by measuring spectral characteristics of target signals output from said optical device under measurement and/or delay times of each wavelength component, comprising:
   a coherent white light source as claimed in one of claims 1 to 12;
   an optical splitting means for receiving coherent white light from said coherent white light source and outputting n groups of spatially-separated coherent white light;
   n units of first wavelength selection means for selecting and outputting a specific wavelength for each of said n groups of coherent white light output from said optical splitting means;
   a time delay means provided for at least one of said n units of first wavelength selection means for imparting a time delay to a specific wavelength component output from at least one of said n units of first wavelength selection means;
   an optical coupling means for receiving said n groups of coherent white light outputted from each of said n units of said first wavelength selection means, at least one of which being received through said time delaying means, and coupling said n groups of specific wavelength components into a single group of optical signals having a plurality of wavelength components;
   an optical device under measurement for receiving said single group of optical signals output from said optical coupling means and outputting target signals;
   a second wavelength selection means for selecting a specific wavelength component from target signals output from said optical device under measurement; and
   measuring means for determining spectral characteristics of target signals output from said optical device under measurement and/or a delay time of each wavelength component.

21. An optical device evaluation system as claimed in claim 20, wherein a location of said first wavelength selection means and said time delay means is interchanged.

22. A wavelength dispersion evaluation system, for evaluating wavelength dispersion characteristics of an optical device under measurement by inputting wavelength-division multiplexed optical signals into said optical device under measurement and measuring delay times of each wavelength component comprising a target signal output from said optical device under measurement, comprising:

a coherent white light source as claimed in one of claims 1 to 12;

an optical splitting means for receiving coherent white light output from said coherent white light source and outputting two groups of spatially-separated coherent white light;

two units of wavelength selection means for selecting and outputting a specific wavelength for each of said two groups of spatially-separated white light output from said optical splitting means;

time delay means provided for at least one of said two units of wavelength selection means for imparting a time delay to a specific wavelength component output from at least one of said two units of wavelength selection means;

an optical coupling means for receiving said two groups of specific wavelength components outputted from said two units of wavelength selection means, at least one of which being received through said time delay means, and coupling said two groups of specific wavelength components into a single group of signals having two wavelength components to be outputted to said optical device under measurement;

an optical device under measurement for receiving said single group of signals output from said optical coupling means, and for outputting target signals; and a delay-time measuring means for determining delay times of each wavelength component of said target signals output from said optical device under measurement.

23. A wavelength dispersion evaluation system as claimed in claim 22, wherein a location of said wavelength selection means and said time delaying means is interchanged.

24. A nonlinear response evaluation apparatus, for evaluating a nonlinear response behavior of an optical device under measurement by inputting wavelength-division multiplexed optical signals into said optical device under measurement and measuring an output optical power at each wavelength component output from said optical device under measurement or spectral characteristics of a target signal, comprising:

a coherent white light source as claimed in one of claims 1 to 12;

an optical splitting means for receiving coherent white light output from said coherent white light source and outputting three groups of spatially-separated coherent white light;

three units of first wavelength selection means for selecting and outputting a specific wavelength for each of said three groups of spatially-separated white light output from said optical splitting means;

time delay means provided for at least one of said three units of first wavelength selection means for imparting a time delay to a specific wavelength component output from at least one of said three units of first wavelength selection means;

an optical coupling means for receiving said three groups of specific wavelength components outputted from said three units of first wavelength selection means, at least one of which being received through said time delay means, and coupling said three groups of specific wavelength components into a single group of signals having three wavelength components to be outputted to said optical device under measurement;

an optical device under measurement for receiving said single group of signals output from said optical coupling means and outputting target signals;

second wavelength selection means for selecting a specific wavelength component from said target signals output from said optical device under measurement; and an optical spectral power measuring means for determining an optical power and/or optical spectral characteristics of said target signals output from said second wavelength selection means.

25. An optical device evaluation apparatus as claimed in claim 24, wherein a location of said first wavelength selection means and said time delay means is interchanged.

26. A coherent white light source comprising:

pump optical pulse generation means for generating pump optical pulses having a wavelength $\lambda_0$; and optical waveguide means for receiving said pump optical pulses generated by said pump optical pulse generation means and generating white pulses having a wavelength range $\Delta\lambda$ centered about a center wavelength at $\lambda_0$;

wherein said waveguide means is provided with a dispersion value and a dispersion slope so as to produce a four-wave mixing light with a wavelength $\lambda_0 \pm \Delta\lambda/2$, and a path length so that an optical power gain of said four-wave mixing-light is not less than one;

wherein an absolute value of said dispersion value in said waveguide means at said wavelength $\lambda_0$ decreases in a direction of light propagation, wherein the maximum absolute value of the dispersion within said waveguide means is $|D_{max}(\lambda_0)|$, the minimum absolute value of the dispersion within said waveguide means is $|D_{min}(\lambda_0)|$, and if the third-order nonlinear coefficient of said optical waveguide is $\gamma$, then $D_{max}(\lambda_0) \cdot \gamma > 0$ and $D_{min}(\lambda_0) \cdot \gamma > 0$, and wherein the peak power of the pump optical pulse P is given by $P=\alpha P_0$, where $\alpha$ is the modification factor, and $P_0$ is the peak power of the pump optical pulse input into said optical waveguide means, and this modification factor $\alpha$ is given by $|D_{max}(\lambda_0)/D_{min}(\lambda_0)|$.

27. The coherent white light source of claim 26 wherein said pump optical pulse is an Nth-order soliton for said waveguide means having a modification factor $\alpha$ given by 1.2 N.

28. The coherent white light source of claim 26 wherein an absolute value of said dispersion value in said waveguide means at said wavelength $\lambda_0$ decreases monotonically in a direction of light propagation.

29. The coherent white light source of claim 26 wherein said pump optical pulse is selected to exhibit a red-shift chirping when a dispersion at a pump wavelength in said waveguide means has normal dispersion, and said pump optical pulse is selected to exhibit a blue-shift chirping when a dispersion at a pump wavelength in said waveguide means has anomalous dispersion, and wherein a modification factor is not more than a value given by $9.1\Delta t_0 \Delta v$ where $\Delta t_0$ is a pulse width of a pump optical pulse and $\Delta v$ is a spectral bandwidth of said pump optical pulse.

30. A coherent white light source comprising:

pump optical pulse generation means which emits a pump optical pulse having a wavelength of $\lambda_0$; and optical waveguide means for receiving said pump optical pulses generated by said pump optical pulse generation means and generating white pulses having a wavelength range $\Delta\lambda$ centered about a center wavelength at $\lambda_O$;

wherein said waveguide means is provided with a dispersion value and a dispersion slope so as to produce a four-wave mixing light with a wavelength $\lambda_O \pm \Delta\lambda/2$, and a path length so that an optical power gain of said four-wave mixing light is not less than one, wherein the absolute value of the dispersion of the wavelength $\lambda_O$ of said waveguide decreases in the direction of propagation, and where the maximum absolute value of the dispersion within said waveguide is $|D_{max}(\lambda_O)|$, the minimum absolute value of the dispersion of said waveguide is $|D_{min}(\lambda_O)|$, and a third order nonlinear coefficient of said waveguide is $\gamma$, then $D_{max}(\lambda_O) \cdot \gamma > 0$ and $D_{min}(\lambda_O) \cdot \gamma > 0$, and where $\alpha$ is a modification factor and $P_O$ is the peak power of the pump optical pulse input to said waveguide, the peak power P of the pump optical pulse is given by $P = \alpha P_O$, and said modification factor $\alpha$ is given by $|D_{max}(\lambda_O)|/|D\ min(\lambda_O)|$; and wherein an optical amplifier is provided between said pump optical pulse generation means and said waveguide means.

31. A coherent white light source of claim 30 wherein said pump optical pulse generation means is a mode-lock fiber ring laser.

32. A coherent white light source of claim 30 where pump optical pulse generation means is a mode-lock semiconductor laser.

33. A coherent white light source of claim 30 where said pump optical pulse generation means is a gain switch semiconductor laser.

34. A coherent white light source of claim 30 wherein said pump optical pulse generation means is an optical pulse generator using an electro-absorption modulator.

35. A coherent white light source characterized in comprising:

pump optical pulse generation means which emits a pump optical pulse having a wavelength of $\lambda_O$;

optical waveguide means for receiving said pump optical pulses generated by said pump optical pulse generation means and generating white pulses having a wavelength range $\Delta\lambda$ centered about a center wavelength at $\lambda_O$;

wherein said waveguide means is provided with a dispersion of the wavelength $\lambda_O \pm \Delta\lambda/2$, and a path slope so as to produce a four-wave-mixing-light having an optical power gain which is not less than one, and the absolute value of the dispersion of the wavelength $\lambda_O$ of said waveguide decreases in the direction of propagation, and where the maximum absolute value of the dispersion within said waveguide is $|D_{max}(\lambda_O)|$, the minimum absolute value of the dispersion of said waveguide is $|D_{min}(\lambda_O)|$, and a third order nonlinear coefficient of said waveguide is $\gamma$, then $D_{max}(\lambda_O) \cdot \gamma > 0$ and $D_{min}(\lambda_O) \cdot \gamma > 0$, and where $\alpha$ is a modification factor and $P_O$ is the peak power of the pump optical pulse input to said waveguide, the peak power P of the pump optical pulse is given by $P = \alpha P_O$, and said modification factor $\alpha$ is given by $|D_{max}(\lambda_O)|/D\ min(\lambda_O)|$; and wherein a dispersion compensation device is connected at an output end of said waveguide means for compensating dispersion in said waveguide means.

36. A coherent white light source characterized in comprising:

pump optical pulse generation means which emits a pump optical pulse having a wavelength of $\lambda_O$, and optical waveguide means for receiving said pump pulses generated by said pump optical pulse generation means for generating a white pulse having a wavelength range $\Delta\lambda$ centered about a center wavelength at $\lambda_O$;

wherein said waveguide means is provided with a dispersion value and a dispersion slope as to produce a four-wave-mixing-light with a wavelength $\lambda_O \pm \Delta\lambda/2$, and a path length so that an optical power gain of said four-wave-mixing-light is not less than one, and the absolute value of the dispersion of the wavelength $\lambda_O$ of said waveguide decreases in the direction of propagation, and where the maximum absolute value of the dispersion within said waveguide is $|D_{max}(\lambda_O)|$, the minimum absolute value of the dispersion of said waveguide is $|D_{min}(\lambda_O)|$, and a third order nonlinear coefficient of said waveguide is $\gamma$, then $D_{max}(\lambda_O) \cdot \gamma > 0$ and $D_{min}(\lambda_O) \cdot \gamma > 0$, and where $\alpha$ is a modification factor and $P_O$ is the peak power of the pump optical pulse input to said waveguide, the peak power P of the pump optical pulse is given by $P = \alpha P_O$, and said modification factor $\alpha$ is given by $|D_{max}(\lambda_O)|/|D\ min(\lambda_O)|$; and wherein an optical band-rejection filter is provided at an output end of said waveguide means for eliminating pump optical pulses output from said waveguide.

37. A coherent white light source characterized in comprising:

pump optical pulse generation means which emits an pump optical pulse having a wavelength of $\lambda_O$; and optical waveguide means for receiving said pump optical pulses generated by said pump optical pulse generation means for generating white pulses having a wavelength range $\Delta\lambda$ centered about a center wavelength at $\lambda_O$;

wherein said waveguide means is provided with a dispersion value and a dispersion slope so as to produce a four-wave-mixing-light with a wavelength $\lambda_O \pm \Delta\lambda/2$, and a path length so that an optical power gain of said four-wave-mixing-light is not less than one, and the absolute value of the dispersion of the wavelength $\lambda_O$ of said waveguide decreases in the direction of propagation, and where the maximum absolute value of the dispersion within said waveguide is $|D_{max}(\lambda_O)|$, the minimum absolute value of the dispersion of said waveguide is $|D_{min}(\lambda_O)|$, and a third order nonlinear coefficient of said waveguide is $\gamma$, then $D_{max}(\lambda_O) \cdot \gamma > 0$ and $D_{min}(\lambda_O) \cdot \gamma > 0$, and where $\alpha$ is a modification factor and $P_O$ is the peak power of the pump optical pulse input to said waveguide, the peak power P of the pump optical pulse is given by $P = \alpha P_O$, and said modification factor $\alpha$ is given by $|D_{max}(\lambda_O)|/|D\ min(\lambda_O)|$; and an optical filter with complex amplitude transmittance for generating coherent white light from white light pulses output from said waveguide means.

* * * * *